(12) United States Patent
Aggarwal et al.

(10) Patent No.: US 12,130,841 B2
(45) Date of Patent: Oct. 29, 2024

(54) UNIFIED FRAMEWORK FOR DYNAMIC CLUSTERING AND DISCRETE TIME EVENT PREDICTION

(71) Applicant: Adobe Inc., San Jose, CA (US)

(72) Inventors: Karan Aggarwal, Seattle, WA (US); Georgios Theocharous, San Jose, CA (US); Anup Rao, San Jose, CA (US)

(73) Assignee: Adobe Inc., San Jose, CA (US)

( * ) Notice: Subject to any disclaimer, the term of this patent is extended or adjusted under 35 U.S.C. 154(b) by 557 days.

(21) Appl. No.: 16/933,361

(22) Filed: Jul. 20, 2020

(65) Prior Publication Data
US 2022/0019888 A1 Jan. 20, 2022

(51) Int. Cl.
*G06F 16/28* (2019.01)
*G05B 23/02* (2006.01)
(Continued)

(52) U.S. Cl.
CPC ....... *G06F 16/285* (2019.01); *G05B 23/0281* (2013.01); *G06F 16/35* (2019.01); *G06F 16/45* (2019.01); *G06F 18/23213* (2023.01); *G06N 3/02* (2013.01); *G06N 3/044* (2023.01); *G06N 3/0442* (2023.01); *G06N 3/08* (2013.01); *G06V 30/19107* (2022.01); *G06F 9/542* (2013.01); *G06N 3/043* (2023.01); *G06N 7/046* (2013.01)

(58) Field of Classification Search
CPC ........ G06F 9/542; G06F 16/285; G06F 16/35; G06F 16/45; G06F 18/23213; G06N 3/02; G06N 3/0436; G06N 3/08; G06N 7/046; G06N 3/044; G06N 3/0442; G05B 23/0281; G06V 30/19107
See application file for complete search history.

(56) References Cited

U.S. PATENT DOCUMENTS 10,176,424 B2 * 1/2019 Danihelka ............. G06N 3/044
11,556,789 B2 * 1/2023 Gugulothu ............ G06N 3/047
(Continued)

OTHER PUBLICATIONS

Du et al. ("Recurrent Marked Temporal Point Processes Embedding Event History to Vector", KDD'16, 2016, pp. 1555-1564) (Year: 2016).*

(Continued)

*Primary Examiner* — Miranda M Huang
*Assistant Examiner* — Chase P. Hinckley
(74) *Attorney, Agent, or Firm* — Kilpatrick Townsend & Stockton LLP

(57) ABSTRACT

A single unified machine learning model (e.g., a neural network) is trained to perform both supervised event predictions and unsupervised time-varying clustering for a sequence of events (e.g., a sequence representing a user behavior) using sequences of events for multiple users using a combined loss function. The unified model can then be used for, given a sequence of events as input, predict a next event to occur after the last event in the sequence and generate a clustering result by performing a clustering operation on the sequence of events. As part of predicting the next event, the unified model is trained to predict an event type for the next event and a time of occurrence for the next event. In certain embodiments, the unified model is a neural network comprising a recurrent neural network (RNN) such as an Long Short Term Memory (LSTM) network.

20 Claims, 7 Drawing Sheets

(51) Int. Cl.
| | |
|---|---|
| G06F 16/35 | (2019.01) |
| G06F 16/45 | (2019.01) |
| G06F 18/23213 | (2023.01) |
| G06N 3/02 | (2006.01) |
| G06N 3/044 | (2023.01) |
| G06N 3/0442 | (2023.01) |
| G06N 3/08 | (2023.01) |
| G06V 30/19 | (2022.01) |
| G06F 9/54 | (2006.01) |
| G06N 3/043 | (2023.01) |
| G06N 7/04 | (2006.01) |

(56) References Cited

U.S. PATENT DOCUMENTS

| | | | | |
|---|---|---|---|---|
| 11,610,126 | B1* | 3/2023 | Heckerman | G06N 20/10 |
| 11,615,305 | B2* | 3/2023 | Deng | G06N 3/045 |
| | | | | 706/30 |
| 2019/0156817 | A1* | 5/2019 | Li | G06N 3/044 |
| 2019/0228312 | A1* | 7/2019 | Andoni | G06F 18/2433 |
| 2019/0332932 | A1* | 10/2019 | Sivaraman | G06N 3/048 |
| 2019/0370651 | A1* | 12/2019 | Cheng | G06N 3/084 |
| 2019/0377818 | A1* | 12/2019 | Andritsos | G06F 16/2465 |
| 2020/0034366 | A1* | 1/2020 | Kivatinos | G06F 16/285 |
| 2020/0184338 | A1* | 6/2020 | Volkovs | G06N 3/045 |
| 2020/0372295 | A1* | 11/2020 | Jansen | G06F 18/2155 |
| 2020/0380556 | A1* | 12/2020 | Ainscough | G06N 5/02 |
| 2021/0012100 | A1* | 1/2021 | Hoffmann | G06N 3/044 |
| 2021/0183525 | A1* | 6/2021 | Overhage | G16H 50/70 |
| 2021/0216760 | A1* | 7/2021 | Howell | G06V 30/36 |
| 2021/0319046 | A1* | 10/2021 | Bandyopadhyay | G06N 3/044 |
| 2021/0383194 | A1* | 12/2021 | Subramanian | G06N 3/08 |

OTHER PUBLICATIONS

Wu et al. ("Reinforcement Learning with Policy Mixture Model for Temporal Point Processes Clustering", https://arxiv.org/abs/1905.12345, arXiv:1905.12345v3 [cs.LG] Jun. 28, 2019, pp. 1-15) (Year: 2019).*

Chung et al. ("Unsupervised classification of multi-omics data during cardiac remodeling using deep learning", Methods 166, 2018, pp. 66-73) (Year: 2018).*

Choi et al. ("Doctor AI Predicting Clinical Events via Recurrent Neural Networks", Proceedings of Machine Learning for Healthcare 2016, JMLR W&C Track vol. 56, arXiv:1511.05942v11 [cs.LG] Sep. 28, 2016, pp. 1-18) (Year: 2016).*

Lee et van der Schaar, "Temporal Phenotyping using Deep Predictive Clustering of Disease Progression" Jun. 15, 2020, arXiv: 2006.08600v1, pp. 1-19. (Year: 2020).*

Bertugli et al., "AC-VRNN: Attentive Conditional-VRNN for Multi-Future Trajectory Prediction" May 17, 2020, arXiv: 2005.08307v1, pp. 1-21. (Year: 2020).*

Su et Shlizerman, "Clustering and Recognition of Spatiotemporal Features through Interpretable Embedding of Sequence to Sequence Recurrent Neural Networks" Jan. 31, 2020, arXiv: 1905.12176v2, pp. 1-9. (Year: 2020).*

Liu et al., "A Hybrid Method with Adaptive Sub-Series Clustering and Attention-Based Stacked Residual LSTMs for Multivariate Time Series Forecasting" Apr. 14, 2020, pp. 62423-62438. (Year: 2020).*

Kheirandishfard et al., "Multi-Level Representation Learning for Deep Subspace Clustering" Jan. 19, 2020, arXiv: 2001.08533v1, pp. 1-10. (Year: 2020).*

Goodfellow et al., "Deep Learning" 2016, pp. 1-777. (Year: 2016).*

Pakman et al., "Neural Clustering Processes" Jun. 23, 2020, arXiv:1901.00409v4, pp. 1-22. (Year: 2020).*

Wolf et al., "Unsupervised Data-driven Automotive Diagnostics with Improved Deep Temporal Clustering" 2019, pp. 1-6. (Year: 2019).*

Ma et al., "Learning Representations for Time Series Clustering" 2019, pp. 1-11. (Year: 2019).*

Prasad et al., "Variational Clustering: Leveraging Variational Autoencoders for Image Clustering" May 10, 2020, arXiv: 2005.04613v1, pp. 1-11. (Year: 2020).*

Mrabah et al., "Adversarial Deep Embedded Clustering: On a Better Trade-off between Feature Randomness and Feature Drift" Sep. 26, 2019, arXiv: 1909.11832v1, pp. 1-25. (Year: 2019).*

Madiraju et al., "Deep Temporal Clustering: Fully Unsupervised Learning of Time-Domain Features" Feb. 4, 2018, arXiv: 1802.01059v1, pp. 1-11. (Year: 2018).*

Tavakoli et al., "An autoencoder-based deep learning approach for clustering time series data" Apr. 20, 2020, pp. 1-25. (Year: 2020).*

Gammelli et Rodrigues, "Recurrent Flow Networks: A Recurrent Latent Variable Model for Spatio-Temporal Density Modelling" Jun. 9, 2020, arXiv: 2006.05256v1, pp. 1-10. (Year: 2020).*

Bandara et al., "Forecasting Across Time Series Databases using Recurrent Neural Networks on Groups of Similar Series: A Clustering Approach" Sep. 12, 2018, arXiv: 1710.03222v2, pp. 1-33. (Year: 2018).*

Baytas et al., Patient Subtyping via Time-Aware LSTM Networks, Proceedings of the 23rd Association for Computing Machinery Special Interest Group on Knowledge Discovery and Data Mining International Conference on Knowledge Discovery and Data Mining, Aug. 13-17, 2017, 10 pages.

Bazzani et al., Recurrent Mixture Density Network for Spatiotemporal Visual Attention, Computer Vision and Pattern Recognition, arXiv:1603.08199, Feb. 11, 2017, 15 pages.

Benson et al., Modeling User Consumption Sequences, Proceedings of the 25th International Conference on World Wide Web, Apr. 11-15, 2016, pp. 519-529.

Beutel et al., Latent Cross: Making Use of Contest in Recurrent Recommender Systems, Proceedings of the Eleventh ACM International Conference on Web Search and Data Mining, Feb. 5-9, 2018, pp. 46-54.

Chapelle, Modeling Delayed Feedback in Display Advertising, Proceedings of the 20th Association for Computing Machinery Special Interest Group on Knowledge Discovery and Data Mining International Conference on Knowledge Discovery and Data Mining, Aug. 24-27, 2014, pp. 1097-1105.

Chen et al., Predictive Analysis by Leveraging Temporal User Behavior and User Embeddings, Proceedings of the 27th Association for Computing Machinery International Conference on Information and Knowledge Management, Available online at: http://ryanrossi.com/pubs/CIKM18-pred-analysis-user-embeddings.pdf, Oct. 22-26, 2018, pp. 2175-2182.

Chung et al., A Recurrent Latent Variable Model for Sequential Data, Advances in Neural Information Processing Systems, Available Online At: http://papers.neurips.cc/paper/5653-a-recurrent-latent-variable-model-for-sequential-data.pdf, 2015, pp. 2980-2988.

Cichocki, Tensor Decomposition: A New Concept in Brain Data Analysis?, arXiv:1305.0395, May 3, 2013, 19 pages.

Du et al., Recurrent Marked Temporal Point Processes: Embedding Event History to Vector, Proceedings of the 22nd Association for Computing Machinery Special Interest Group on Knowledge Discovery and Data Mining International Conference on Knowledge Discovery and Data Mining, Aug. 13-17, 2016, pp. 1555-1564.

Du et al., Time-Sensitive Recommendation from Recurrent User Activities, Proceedings of the 28th International Conference on Neural Information Processing Systems, vol. 2, Dec. 2015, pp. 3492-3500.

Garcia-Garcia et al., A New Distance Measure for Model-Based Sequence Cluttering, Institute of Electrical and Electronics Engineers Transactions on Pattern Analysis and Machine Intelligence, vol. 31, No. 7, Jul. 2009, pp. 1325-1331.

Grbovic et al., E-commerce in Your Inbox: Product Recommendations at Scale, Proceedings of the 21th ACM SIGKDD International Conference on Knowledge Discovery and Data Mining, Available online at: https://arxiv.org/pdf/1606.07154v1.pdf, Aug. 10-13, 2015, pp. 1809-1818.

Guo et al., Improved Deep Embedded Clustering with Local Structure Preservation, Proceedings of the 26th International Joint Conference on Artificial Intelligence, Aug. 2017, pp. 1753-1759.

(56) References Cited

OTHER PUBLICATIONS

Hauser et al., kClust: Fart and Sensitive Clustering of Large Protein Sequence Databases, BMC Bioinformatics, vol. 14, No. 1, 2013, 12 pages.

Jing et al., Neural Survival Recommender, Proceedings of the Tenth Association for Computing Machinery International Conference on Web Search and Data Mining, Feb. 6-10, 2017, pp. 515-524.

Joulin et al., Bag of Tricks for Efficient Text Classification, arXiv:1607.01759, Jul. 2016, 5 pages.

Kapoor et al., Just in Time Recommendations: Modeling the Dynamics of Boredom in Activity Streams, Proceedings of the Eighth Association for Computing Machinery International Conference on Web Search and Data Mining, Feb. 2-6, 2015, pp. 233-242.

Kapoor et al., Measuring Spontaneous Devaluations in User Preferences, Proceedings of the 19th Association for Computing Machinery Special Interest Group on Knowledge Discovery and Data Mining International Conference on Knowledge Discovery and Data Mining, Aug. 11-14, 2013, pp. 1061-1069.

Kumar et al., Predicting Dynamic Embedding Trajectory in Temporal Interaction Networks, Proceedings of the 25th Association for Computing Machinery Special Interest Group on Knowledge Discovery and Data Mining International Conference on Knowledge Discovery and Data Mining, Aug. 4-8, 2019, pp. 1269-1278.

Mei et al., The Neural Hawkes Process: A Neurally Self-Modulating Multivariate Point Process, Proceedings of the 31st International Conference on Neural Information Processing Systems, Dec. 2017, 21 pages.

Melnykov, ClickClust: An R Package for Model-Based Clustering of Categorical Sequences, Journal of Statistical Software, vol. 74, No. 9, Oct. 2016, 34 pages.

Mikolov et al., Distributed Representations of Words and Phrases and Their Compositionality, Advances in Neural Information Processing Systems, vol. 26, Oct. 2013, 9 pages.

Mozer et al., Discrete Event Continuous Time RNNs, Neural and Evolutionary Computing, Machine Learning, Oct. 11, 2017, 21 pages.

Petitjean et al., A Global Averaging Method for Dynamic Time Warping, With Applications to Clustering, Pattern Recognition, vol. 44, No. 3, Mar. 2011, pp. 678-693.

Quadrana et al., Sequence Aware Recommender Systems, Association for Computing Machinery Computing Surveys, vol. 51, No. 4, Article 66, Jul. 2018, pp. 66:1-66:36.

Sadagopan et al., Characterizing Typical and Atypical User Sessions in Clickstreams, International World Wide Web Conference Committee, Alternate Track: Industrial Practice and Experience, Apr. 21-25, 2008, pp. 885-893.

Scholz, R Package Clickstream: Analyzing Clickstream Data with Markov Chains, Journal of Statistical Software, vol. 74, No. 4, Oct. 2016, 17 pages.

Van Der Maaten et al., Visualizing Data using t-SNE, Journal of Machine Learning Research, vol. 9, Nov. 2008, pp. 2579-2605.

Vasile et al., Meta-Prod2Vec—Product Embeddings Using Side-Information for Recommendation, Proceedings of the 10th Association for Computing Machinery Conference on Recommender Systems, Sep. 15-19, 2016, pp. 225-232.

Wang et al., Coevolutionary Latent Feature Processes for Continuous-Time User-Item Interactions, Proceedings of the 30th International Conference on Neural Information Processing Systems, Dec. 2016, 10 pages.

Wang et al., Unsupervised Clickstream Clustering for User Behavior Analysis, Proceedings of the CHI Conference on Human Factors in Computing Systems, May 7-12, 2016, pp. 225-236.

Wu et al., Returning is Believing: Optimizing Long-Term User Engagement in Recommender Systems, Proceedings of the 2017 Association for Computing Machinery on Conference on Information and Knowledge Management, Nov. 6-10, 2017, pp. 1927-1936.

Xiao et al., Wasserstein Learning of Deep Generative Point Process Models, Proceedings of the 31st International Conference on Neural Information Processing Systems, Dec. 2017, pp. 3247-3257.

Xie et al., Unsupervised Deep Embedding for Clustering Analysis, Proceedings of the 33rd International Conference on Machine Learning, vol. 48, May 24, 2016, pp. 478-487.

Zheng et al., DRN: A Deep Reinforcement Learning Framework for News Recommendation, Proceedings of the World Wide Web Conference, Track: Intelligent and Autonomous systems on the Web, Apr. 23-27, 2018, pp. 167-176.

Zhu et al., What to Do Next: Modeling User Behaviors by Time-LSTM, Proceedings of the Twenty-Sixth International Joint Conference on Artificial Intelligence, Aug. 2017, pp. 3602-3608.

* cited by examiner

200

Predicting a next event type and a time of occurrence for a next event after a sequence of events and performing dynamic clustering for the sequence of events using a neural network

210

Receiving information for a sequence of events

215

Providing the sequence of events information received in 210 as input to a trained neural network, where the neural network has been trained to (a) predict an event type for the next event that will occur after the sequence of events and predict a time when the next event will occur, and (b) perform clustering for the sequence of events into a pre-specified number of clusters

220

Generating, using the embedding layer of the neural network, a vector representation for each event in the sequence of events received in 210 and provided as input to the neural network in 215

230

Predicting, using the neural network and based upon the vector representations generated in 320, (a) an event type for a next event to occur after the sequence of events and predict time information indicative of when the next event will occur and (b) perform a clustering operation on the sequence of events

240

Outputting, using the neural network, the information related to the next event prediction and the clustering operation to the user or to a downstream process to consume the information

Training a neural network to predict an event type and a time of occurrence for a next event after a sequence of events and to perform dynamic clustering for the sequence of events

310

Receiving information indicating a loss function for predicting an event type for a next event after a sequence of events

320

Receiving information indicating a loss function for predicting a time of occurrence of a next event after a sequence of events

330

Receiving information indicating a loss function for clustering that takes into account a hidden state

340

Receiving information indicating a regularization loss function

350

Combining each of the determined loss functions to determine a combined loss function

360

Training the RNN using the combined loss function to generate a unified model

*Fig. 3*

UNIFIED FRAMEWORK FOR DYNAMIC CLUSTERING AND DISCRETE TIME EVENT PREDICTION

TECHNICAL FIELD

This disclosure relates generally to analysis of discrete time event sequences. More specifically, the present disclosure describes techniques for using a single unified machine learning model (e.g., a neural network) for performing both supervised event predictions and unsupervised time-varying clustering for a sequence of events (e.g., a sequence representing user behavior).

BACKGROUND

Discrete time event sequences are commonly encountered in a variety of real-world domains. For example, the sequence of events may correspond to events arising from user actions. For instance, the sequence of events may correspond to a user's interactions with a web platform, such as the view seen by the user, the user's browsing history sequence, and the like. Various techniques have been used in the past to study and analyze such sequences of events. For example, supervised learning techniques have been used to predict a next user action and when the next action will occur. However, such conventional supervised learning models do not provide information to track evolution of user behavior in the sequences. For example, the progress of a user over time as the user interacts with a web platform.

Currently, some unsupervised techniques such as clustering have been applied to analyze sequence of events. For example, Markov models has been used for time-series and discrete time event modeling that model each sequence individually, but these don't consider the time component of the sequences. Some sequence similarity based methods have also been employed, but these do not have a concept of time gaps and evolution of clusters and are thus static in nature.

SUMMARY

The present disclosure describes techniques for using a single unified machine learning model (e.g., a neural network) for performing both supervised event predictions and unsupervised time-varying clustering for a sequence of events (e.g., a sequence representing user behavior). Techniques are described for training a single unified model for both predicting next events and performing dynamic clustering for a sequence of events. The trained unified model can then be used for, given a sequence of events as input, predict a next event to occur after the last event in the sequence and generate a clustering result by performing a clustering operation on the sequence of events. As part of predicting the next event, the unified model is trained to predict an event type for the next event and a time of occurrence for the next event. In certain embodiments, the unified model is a neural network. In certain instances, the neural network is a recurrent neural network (RNN) such as an Long Short Term Memory (LSTM) network.

In contrast to conventional techniques discussed above, supervised predictions (e.g. event type and time of occurrence predictions) and unsupervised dynamic clustering are jointly performed in a neural network using a unified model. This enables systems to predict both an event type and associated time of occurrence for the next event in a sequence of events and to indicate an evolution of user behavior in the sequence of events through clustering over the sequence of events. Various embodiments are described herein, including methods, systems, non-transitory computer-readable storage media storing programs, code, or instructions executable by one or more processors, and the like.

In certain embodiments, a computer system receives, using a neural network, a sequence of events and time of occurrence associated with each event of the sequence of events that indicates when the even occurred. Using an embedding layer of the neural network, the computer system generates a vector representation for each event in the sequence of events The computer system, using the neural network and based upon the vector representations, predicts a next event to occur after the sequence of events, the prediction including an event type for the next event and a time of occurrence for the next event. The computer system, using the neural network, performs a clustering operation and outputs clustering information for the sequence of events not including the next event using the neural network.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 2 depicts an example of a process for predicting a next event type and a time of occurrence for a next event after a sequence of events and performing dynamic clustering for the sequence of events using a neural network, according to certain embodiments disclosed herein.

FIG. 3 depicts an example of a process for training a neural network to predict an event type and a time of occurrence for a next event after a sequence of events and to perform dynamic clustering for the sequence of events, according to certain embodiments disclosed herein.

DETAILED DESCRIPTION

Figure 1:
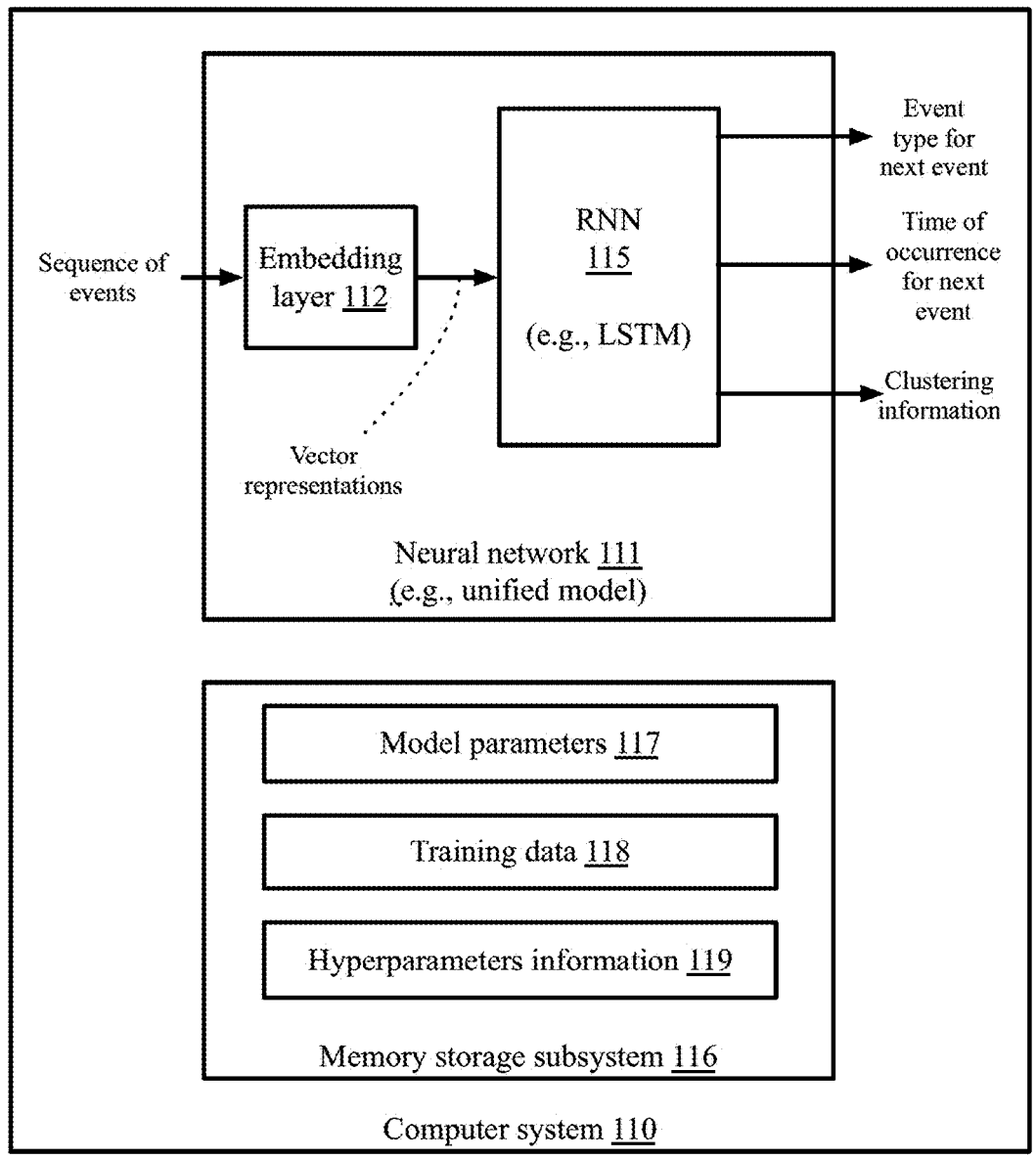
FIG. 1 depicts an example of a computing environment for predicting a next event type and a time of occurrence for a next event after a sequence of events and performing dynamic clustering for the sequence of events using a neural network, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure describes techniques for using a single unified machine learning model (e.g., a neural network) for performing both supervised event predictions and unsupervised time-varying clustering for a sequence of events (e.g., a sequence representing user behavior). Techniques are described for training a single unified model for both predicting next events and performing dynamic clustering for a sequence of events. The trained unified model can then be used for, given a sequence of events as input, predict a next event to occur after the last event in the sequence and generate a clustering result by performing a clustering operation on the sequence of events. As part of predicting the next event, the unified model is trained to predict an event type for the next event and a time of occurrence for the next event. In certain embodiments, the unified model is a neural network. In certain instances, the neural network is a a recurrent neural network (RNN) such as an Long Short Term Memory (LSTM) network.

As discussed above in the Background section, discrete time events sequences are currently analyzed using supervised learning techniques to predict next events, but these techniques do not provide information to track evolution, e.g., user behavior evolution, over the sequences. Separately, clustering techniques have been used to analyze sequence of events but these techniques do not consider the time component of the sequences and their results are thus static in nature. In contrast to the conventional techniques, the techniques disclosed in his disclosure enable joint performance of supervised next event predictions and clustering of event sequence data using a single neural network representing a unified model. This enables systems to make supervised predictions of a next event after a sequence of events together with dynamic clustering over the sequence of events to indicate an evolution of user behavior in the sequence of events.

Certain embodiments described herein address the prior art limitations by predicting an event type and a time of occurrence for a next event after a sequence of events and performing dynamic clustering for the sequence of events using a unified machine learning model such as a neural network. In certain embodiments, the event type prediction for the next event, the time of occurrence prediction for the next event, and the dynamic clustering of the sequence of events functionality is provided by a computer system using a neural network. The computer system implementing the neural network, receives sequences of events, and for each sequence of events, generates vector representations for the events in the sequence of events, generates an event type prediction for a next event for the sequence of events, a time of occurrence prediction for the next event, and clustering information for the sequence of events, using a unified model.

In certain embodiments, a computer system implementing the neural network, receives information identifying a sequence of events and, for each event in the sequence of events, the received information identifies an event type for the event and time information indicating a time at which the event occurred. The event type information or identifier may be selected from a set of event type identifiers. The time information associated with an event and indicative of when the event occurred may be expressed in different ways, such as, for example, the actual time of occurrence of the event, as a time gap or time delta from the occurrence of the previous event in the sequence, and the like. For example, the time information for each event in the sequence of events may comprise a time stamp logged by a system logging the event. In an example, the computer system receives the sequence of events and associated event type and time information associated with each event of the sequence of events from another computer system (e.g., a computer system that tracks or logs events) via a network. In another example, the computer system, as an event occurs or when the computer system determines or otherwise receives notice that an event has occurred, logs time stamp information for the event, identifies an event type for the event, and stores the sequence of events and time information representing a time of occurrence for the event and event type identifier indicating the respective event type. In other examples, receiving the sequence of events information comprises retrieving the sequence of events information from a memory location where the information is stored. In certain examples, the computer system converts the time information into time gap information for the sequence of events. An example time gap for an event comprises a length of time between a time at which the event occurred and a time at which the preceding event in the sequence of events occurred. In certain embodiments, the sequence of events is input to a trained neural network. In an example, the neural network has been trained to (a) predict an event type for the next event that will occur after the sequence of events and predict a time when the next event will occur, and (b) perform clustering for the sequence of events into a pre-specified number of clusters.

In certain embodiments, unified model, such as a neural network, comprises multiple layers including one or more layers referred to collectively as the embedding layer of the neural network. In certain embodiments, the embedding layer receives information related to the sequence of events as input and generates a vector representation for each event in the sequence of events. In some implementations, for each event in the sequence of events, a vector representation is generated for each event in the sequence of events and a separate vector representation is generated for the time information associated with that event, and then the two vector representations are combined to create a vector representation for the event in joint event-time space. The vector representation of an event in a sequence of events represents both the event type and its associated time of occurrence. The vector representation represents a point in joint event-time space. In certain embodiments, the embedding layer encodes the sequence of events time of occurrence information (or time gap information) into a lower-dimensional space using an embedding matrix. In one example, for each event in the sequence of events, the embedding layer maintains a table of the event in the sequence to a latent space mapping. For each incoming event in the sequence of events or stream, a corresponding dimensional vector representation for the event is obtained with a lookup operation. In certain examples herein, when the neural network is trained, the embedding matrix is initialized with random values and updated during the training to represent each of the events in the sequence of events. In an example, the vector representations for the events of the sequence of events in joint event-time space are concatenated.

In certain embodiments, the neural network then, based upon the vector representations for the events in the sequence of events, (a) predicts a next event to occur after the sequence of events including an event type and also predicts a time of occurrence for the next event, and (b) generates a clustering result comprising information resulting from performing a clustering operation for the sequence of events.

In certain embodiments, the neural network may comprise a recurrent neural network (RNN) portion. In some implementations the RNN portion may be an LSTM, which receives as input the vector representation generated by the embedded layer. For example, the RNN or LSTM receives, for a sequence of events, input data comprising the concatenated vector representations for the events in the sequence of events. The RNN or LSTM determines a current cell state and a current hidden state (or hidden activation) of the recurrent neural network, and, based on the input data, determines an updated cell state of the recurrent neural network, determines an updated hidden state (or updated hidden activation) and then determines a next event prediction including an event type and a time of occurrence for the next event prediction based on the updated hidden state and the updated cell state. In certain examples, the time of occurrence information for the next event prediction comprises a time gap corresponding to a distance of time between an occurrence the last event in the received sequence and an occurrence the predicted next event. In an example, the clustering operation performed on the sequence of events information is a function of the updated hidden state (or the updated hidden activation) of the neural network. In an example, the clustering information indicates, for each event in the sequence of events not including the predicted next event, a cluster identifier identifying each cluster of a set of clusters and a corresponding probability that the event is associated with the respective cluster associated with the respective cluster identifier. In certain examples, the clustering information, for each event of the sequence of events not including the next event prediction, provides a distribution of cluster affinities for the respective event with respect to each cluster of a set of clusters.

In certain embodiments, during a training phase, the neural network is trained to predict an event type and time of occurrence for a next event in a sequence of events and perform dynamic clustering for the sequence of events not including the next event. In an example, the training data used for the training comprises sets of sequences of events for a plurality of users, and for each sequence of events, the ground truth identifying the next event and the time of occurrence of the next event. In an example, as part of the training, the various weights (e.g., embedding matrix, values of weight matrices, and bias values of the neural network are initialized with random values and then updated iteratively with each training pass so as to minimize the loss function between the next event predictions (including associated event type data and time of occurrence information) made by the neural network and the corresponding ground truth values.

In certain embodiments, multiple loss functions are used for training the neural network. For example, a first loss function is used for predicting an event type for a next event in the sequence of events, for example, an event type loss function comprises a negative log likelihood ("NLL") function that minimizes the cross-entropy between a predicted distribution and a ground truth distribution. Another loss function may be used for predicting a time of occurrence (or time gap) for the next event in the sequence of events.

Another loss function may be used for clustering the sequence of events not including the next event, for example a Kulback-Leibler divergence ("KL-divergence") function, that takes into account a hidden state (or a hidden activation) of the neural network. Yet another loss function such as a regularization loss function is used to prevent abrupt changes in clusters of consecutive events based on a regularization constant. In certain embodiments, the various loss functions are combined into a combined loss function. The combined loss function is then used during the training phase to optimize the unified model by modifying the model parameters such as the weights and biases associated with nodes in the different layers of the unified neural network model over multiple iterations of training the neural network so that next event predictions (including event type and time of occurrence) more closely correspond to corresponding ground truth values as the loss is minimized and so that clustering output is interpretable or otherwise useful. The neural network is trained to perform the clustering operation using the training data by making soft assignments of clusters for each event of a sequence of events and minimizing the combined loss function over multiple iterations of training of the neural network by modifying model parameters associated with the clustering loss component of the combined loss function. Example model parameters associated with clustering loss include a normalization factor that controls cluster size and a regularization constant that prevents abrupt changes in cluster affinity between consecutive events. The unified model, trained on sequences of events data from a plurality of users, is able to predict a next event (including an event type and a time of occurrence) after a sequence of events associated with a single user and also provide clustering information for the sequence of events.

The unified framework for joint next event prediction (including an event type prediction and time of occurrence prediction for a next event after a sequence of events) and clustering of an event sequence described herein provides several improvements and benefits over conventional techniques. In contrast to conventional techniques discussed above that utilize a static clustering model separately from a next event prediction model, the unified framework enables both predictions to be trained and performed jointly, whereas conventional techniques are unable to provide a joint output of clustering for a sequence of events and next event prediction for a next event to occur after the sequence of events.

Particularly, a dynamic clustering over a sequence of events, as described herein, is superior to static clustering outputs of conventional systems, providing an observer a more meaningful interpretation of an evolution of cluster affinities over time as opposed to a conventional static clustering of individual events. Example dynamic clustering provides cluster affinities for each event in a sequence of events and takes time information associated with each event (or a time gap associated with each event) into consideration, showing an evolution of cluster affinities over time, whereas static clustering only considers a single point in time when determining cluster affinities.

Also, training and using a unified model is superior to the conventional method of training separate models catered to separate event prediction and clustering operations, which may require usage of more computing resources and time than using a unified model. Particularly, training a unified model as described herein may require more computational resources than either of a separate clustering model and a separate next event prediction model, yet require less computational resources than the sum of the computational resources necessary to run both of the separate models in tandem.

Further, a unified framework is superior to conventional systems because joint event prediction and clustering operations reinforce each other. Particularly, the next event prediction and clustering operation reinforce each other as both consider a single hidden state determined via the neural network based on input data. Also, the next event prediction and clustering operation are jointly optimized as both are outputs of the unified model that is trained using a combined loss function that takes into account one or more loss functions to simultaneously optimize outputs of event type prediction, time of occurrence prediction, and clustering information output. As a result of applying the techniques described herein, the clustering information generated by the unified model approach is superior when compared to conventional approaches while the next event prediction information (including event type and time of occurrence predictions for a next event to occur after a sequence of events) accuracy is comparable to conventional next event prediction information determined using a conventional supervised learning model.

Referring now to the drawings, FIG. 1 depicts an example of a computing environment 100 comprising a computer system 110 that executes a unified machine learning (ML) based framework this is trained for predicting a next event for a sequence of events and also for performing a dynamic clustering operation for the sequence of events. In the embodiment depicted in FIG. 1, the unified ML-based framework is implemented using a neural network. The computer system 110 depicted in FIG. 1 is merely an example and is not intended to unduly limit the scope of claimed embodiments. One of ordinary skill in the art would recognize many possible variations, alternatives, and modifications. For example, in some implementations, the neural network 111 can be implemented using more or fewer systems or subsystems than those shown in FIG. 1, may combine two or more subsystems, or may have a different configuration or arrangement of systems or subsystems.

As depicted in FIG. 1, information related to a sequence of events is provided as input to neural network 111. The sequence of events includes events that have already occurred in order of time. For example, the sequence may comprise a first event, a second event that occurred after the first event, a third event that occurred after the second event, and so on. Accordingly, each sequence may have a start event representing the event in the sequence with the earliest time of occurrence and a last event representing the event in the sequence with the latest time of occurrence. A sequence of events may contain zero or more events between the start event and the last event.

The information related to the sequence of events that is input to neural network 111 may include, for each event, information identifying an event type identifier and a time indicative of when the event occurred. The event type identifier may be selected from a set of event type identifiers. An event identifier associated with an event may provide a category or class for the event.

The time indicative of when the event occurred may be expressed in different ways. In some instances, the time may indicate the actual time of occurrence of the event. For example, the time associated with an occurrence of an event in the sequence may indicate a time stamp logged by a system indicative of when the event occurred. In some other instances, the time of occurrence associated with an event maybe expressed as a time gap or time delta from the occurrence of the previous event in the sequence. For example, for a particular event in the sequence, the associated time of occurrence may indicate that the particular event occurred after a certain time gap (e.g., delta time) from the previous event.

In certain embodiments, the sequence of events may represent events arising from the behavior of one or more users. For example, for a particular user browsing the web, the sequence of events may be events corresponding to the user's browsing activity, such as the user's mouse/keyboard clicks during the browsing session. The event type identified may identify the nature of the click, for example, clicks for "selecting URL link," "selecting content on a page," "navigating to a different portion of the page," "entering information in a text box on a page," etc.

Upon receiving information about the sequence of events, neural network 111, which has been previously trained, is configured to: (a) predict the event type of the next event that will occur after the sequence of events and a time when the next event will occur; and (b) perform a clustering operation for the sequence of events. In this manner, the neural network 111 provides a unified ML framework and model for performing a prediction and also for performing a clustering operation. The predicted event type is selected from the set of event types. The predicted time of occurrence for the next event may be expressed as a time of occurrence of the next event or a time gap from the occurrence of the last event in the sequence of events to the predicted time of occurrence for the next event.

The neural network 111 is trained to perform the prediction and clustering operations. For example, the neural network 11 may be trained using training data 118 that may be stored in a memory storage subsystem 116 of computer system 110. A training framework may be provided for training the neural network 111. Example training data 118 may comprise sequences of events and time of occurrence information for a plurality of users that is used to train the neural network 111. Hyperparameters information 119 related to various hyperparameters used during the training phase may also be stored in the memory storage subsystem 116. Example hyperparameters information 119 may comprise one or more hyperparameters by which to train the neural network 111 over a training period, for example, a learning rate, a batch size, or and/other hyperparameters information 119. In certain embodiments, supervised training techniques are used to train the neural network 111 to make predictions about the next event, including predictions about the event type for the next event and a time when the next event will occur. As part of this training, one or more loss functions may be defined and then optimized using back propagation techniques to set weights, biases, and other model parameters 117 for the neural network 111. The neural network 111 is also trained to perform clustering operations. One or more loss functions are defined for the clustering operation and optimized during the training phase to set weights, biases, and other model parameters 117 for the neural network 111. In this manner, the neural network 111 is trained to become a common unified framework or model for performing next event prediction and clustering operations.

The neural network 111 may be implemented using software (e.g., code, instructions, program) executed by one or more processing units (e.g., processors, cores), hardware, or combinations thereof. The software may be stored on a non-transitory storage medium (e.g., on a memory device). The neural network 111 may comprise multiple layers. In the example embodiment depicted in FIG. 1, the neural network 111 comprises an embedding layer 112 and a RNN 115. The structure of neural network 111 depicted in FIG. 1 is meant as an example and is not intended to be restrictive. The neural network 111 may also comprise other layers and networks not shown in FIG. 1.

The embedding layer 112 of the neural network 111 is trained to generate vector representations for the sequence of events. The vector representation for an event in the sequence of events represents a point in a joint event-time space and represents both the event type and the time of occurrence associated with the event in the sequence of events. Further details related to the generation of the vector representations is described below.

The vector representations for the sequence of events are input to a recurrent neural network ("RNN") 115 within the neural network 111. RNN 115 can include one or more layers within neural network 111. RNN 115 is trained to perform both a prediction operation and a clustering operation based upon the vector representations for the sequence of events. The prediction operation involves predicting an event type for the next event that will occur after the sequence of events and a time when the next event will occur. The clustering operation involves clustering the sequence of events into a pre-specified number of clusters. In this manner, neural network 111 provides a unified model or framework for performing both next event prediction and clustering operations.

There are several advantages gained from using a unified model for performing prediction and clustering operations for a sequence of events. Training a single model that performs event prediction and clustering operations is advantageous to training two separate models catering to each task. Using the unified model (instead of separate event prediction and clustering models) is advantageous because a developer does not have to create two separate models and maintain the separate models for two deployment scenarios, since the platform's requirements can change and a single model would suffice. Additionally, in the unified model, unlike conventional methods, the event prediction and clustering operations reinforce information (e.g. a hidden state) to each other, especially the clustering operation that considers an event type of the next event as well as a time of occurrence for the next event while forming clusters for the sequence of events. The clustering mechanism of the unified model provides clustering into a time-varying sequential framework while conventional clustering models (e.g. computer vision work for clustering image data) merely cluster static data and cannot provide insight into behavior patterns over time through conventional clustering outputs User platforms providing services to users may use this insight into user behavior to develop interventions that are helpful to the platform or to users. The unified model provides an improved clustering output over conventional clustering approaches while also performing as well as conventional supervised learning approaches when measured on event prediction (including event type and a time of occurrence for a next event to occur after a sequence of events) tasks In certain embodiments, RNN 115 may be implemented as a long-term short-term memory ("LSTM") network. An example LSTM network comprises a repeating module comprising multiple interacting layers. A LSTM network utilizes non-linear gates (e.g. an input gate, a forget gate, an output gate) to regulate a flow of signals used to update a cell state and a hidden state and to provide outputs based on the updated cell state and updated hidden state according to functions including weight matrices and biases. In an example, in each successive module of the LSTM network, the LSTM network considers a current hidden state and a current cell state from a previous module. For example, the neural network determines an updated cell state based on the current cell state output by the previous LSTM module, a forget signal determined via a forget gate to remove information from the cell state, and an input signal determined via an input gate to add information to the cell state. The LSTM network outputs an updated hidden state based on the current cell state and an output signal determined via an output gate. In an example, the updated hidden state and updated cell state are saved for a subsequent event prediction in a successive module of the LSTM. A next event prediction (including a next event type for a next event and time of occurrence associated with the next event) and clustering information are each determined based on the updated hidden state.

The LSTM network architecture described herein is an example and other neural network architectures may be utilized by the computer system in addition to or instead of the LSTM network architecture, such as a variational recurrent neural network ("VRNN"), a mixture density network ("MDN"), a gated recurrent unit ("GRU") network, or other appropriate neural network architecture, and/or combinations or modifications of one or more neural network architectures. Further, the functions described herein to determine the event type for the next event after a sequence of events, the time of occurrence for the next event, and the clustering information for the sequence of events based on the updated hidden state are examples, and other functions may be used as appropriate. Further, in certain examples, one or more outputs of the neural network, states of the neural network, or values determined by the neural network in addition to or instead of the updated hidden state may be used to determine the event type and the time of occurrence for the next event, and the clustering information using appropriate functions to derive such outputs.

FIG. 2 depicts an example of a process 200 for predicting a next event type and a time of occurrence for a next event after a sequence of events and performing dynamic clustering for the sequence of events using a neural network 111, according to certain embodiments of the present disclosure. One or more computing devices (e.g., the computer system 110) implement operations depicted in FIG. 2 by executing suitable program code. The software or program code may be stored on a non-transitory storage medium (e.g., on a memory device). The process depicted in FIG. 2 and described below is intended to be illustrative and non-limiting. Although FIG. 2 depicts the various processing blocks occurring in a particular sequence or order, this is not intended to be limiting. In certain alternative embodiments, the blocks may be performed in some different order or some blocks may also be performed in parallel. In certain embodiments, such as in the embodiment depicted in FIG. 1, the processing depicted in FIG. 2 may be performed by the computer system 110. For illustrative purposes, the process 200 is described with reference to certain examples depicted in the figures. Other implementations, however, are possible.

At 210, the process 200 involves receiving information for a sequence of events. For example, in the embodiment depicted in FIG. 1, the information in 210 may be received by computer system 110. The information received in 210 may include, for each event in the sequence of events for a user, information identifying an event type for the event and a time indicating a time at which the event occurred. The event type identifier may be selected from a set of event type identifiers. The time associated with an event and indicative when the event occurred may be expressed in different ways, such as, for example, the actual time of occurrence of the event, as a time gap or time delta from the occurrence of the previous event in the sequence to the time of occurrence of the event, and the like.

For example, the time associated with an event in the sequence of events may correspond to a time when event occurs or when occurrence of the event is noticed or logged by a system. In some instances information related to the sequence of events may be stored in memory subsystem 117.

In certain instances, the sequence of events may represent events depicting or arising from the behavior of one or more users. For example, the sequence of events may comprises n user events and associated time of occurrence $\{(e_{ui}, t_{ui})\}_{u=1}^{n}$ where the $e_{ui} \in \mathbb{E}$ and represents the event type, and $t_{ui}$ represents the time associated with the $i^{th}$ event in the sequence for a user u and $\mathbb{E}$ is the set of all possible event types. The time of occurrence associated with each event in a sequence of events can be a time stamp when the event occurred. For example, for a user, the information for the sequence of events may comprise an event type identifier and a logged time stamp associated with each event in the sequence of events, for example, "{E1(A, 11/20/2019 14:05:10), E2(B, 11/20/2019 14:06:50), E3(A, 11/20/2019 14:07:00), E4(C, 11/20/2019 14:08:40), E5(A, 11/20/2019 14:09:52), . . . En(B, 11/20/2019 22:30:05)}," where the example sequence of events includes, for each event, one of three example event type identifiers A, B, or C followed by a timestamp indicating a day, month, year, hour, minute, and second associated with the event in the format DD/MM/YYYY HH:MM:SS. Other formats for event sequences and time of occurrence may be used as appropriate. In an example, event type A associated with event type identifier A comprises selection of a first user interface object by the user, event type B associated with event type identifier B comprises selection of a second user interface object by the user, and event type C associated with event type identifier C comprises hovering over a third user interface object by the user.

In certain instances, instead of time stamps, the time of occurrence may be represented as time gaps between successive events in the sequence. For example, if the time of occurrence is specified as times gaps, for n user events in a sequence may comprise $\{(e_{ui}, \Delta_i)\}_{u=1}^{n}$ where $\Delta_i = t_{ui} - t_{u(i-1)}$ representing a time gap from an event in the sequence to the event preceding the event in the sequence. In certain examples, the computer system 110 may receive the time of occurrence for events in the form of time stamps and may convert the time stamps to time gaps representation. As an example, the time gap information for a particular event in the sequence may expressed as a length of time between a time at which the particular event occurred and a time of occurrence of an event that occurred immediately prior to the particular event in the sequence of events. For example, for a user, the information for a sequence of events may, for each event in the sequence, identify an event type identifier and an indication of a time gap between the event associated with the event type identifier and the preceding event in the sequence, for example, "{E1(A, 00:00:00), E2(B, 00:01:40), E3(A, 00:00:10), E4(C, 00:01:10), E5(A, 00:01:12), . . . En(B, 00:05:10)}," where the example sequence of events includes, for each event, one of three example event identifiers A, B, or C followed by a time gap indicating an hour, minute, and second associated with the event in the format HH:MM:SS. In the example, the second event (E2) in the sequence occurred 1 minute 40 seconds after the first event E1, the third event (E3) in the sequence occurred 10 seconds after the second event E2, the fourth event (E4) in the sequence occurred 1 minute 10 seconds after the third event E3, and so on. Other formats for event sequences and time of occurrence information may be used as appropriate.

At 215, the sequence of events information received in 210 is provided as input to a trained neural network, where the neural network 111 has been trained to (a) predict an event type for the next event that will occur after the sequence of events and predict a time when the next event will occur, and (b) perform clustering for the sequence of events into a pre-specified number of clusters. In an example, the neural network 111 has been trained using sequences of events for multiple users so that it can predict, for a single user based on a sequence of events associated with the single user, (1) an event type for the next event that will occur after the sequence of events, (2) a time when the next event will occur, and (3) a dynamic clustering output for the sequence of events comprising clustering of the sequence of events including a cluster affinity, for each event of the sequence of events, to each cluster of the pre-specified number of clusters.

At 220, an embedding layer of the neural network (e.g., embedding layer 112 of neural network 111) generates a vector representation for each event in the sequence of events received at 210 and provided as input to the neural network in 215. The vector representation of an event represents both the event and its associated time of occurrence. The vector representation for an event in the sequence of events represents a point in joint event-time space.

In certain instances, as part of the processing in 220, the embedding layer 112 generates a vector representation for each event type in the sequence of events and a vector representation for the time of occurrence information associated with that event, and then combines the two vector representations to create a vector representation for the event in joint event-time space. In certain embodiments, the embedding layer encodes the sequence of events including event type information and time of occurrence (or time gap information) into a lower-dimensional space using an embedding matrix $\Phi \in \mathbb{R}^{|\mathbb{E}| \times d_1}$ where R represents the vector space (e.g., Euclidean n-space) $d_1$ represents a dimension of the representation and $|\mathbb{E}|$ represents the number of events. In one example, the embedding layer maintains a table of an event in the sequence to a latent space mapping. For each incoming event in the sequence of events or stream, a corresponding $d_1$ dimensional vector representation for the event is obtained with a lookup operation. In certain examples herein, when the neural network 111 is trained, the embedding matrix $\Phi$ is initialized with random values and updated during the training to represent each of the $\mathbb{E}$ events.

In certain embodiments, a projection of time of occurrence (or projection of time gap information) is used that projects time of occurrence information (or time gap information) in a dimensional space. For example, a non-linear projection of time gap $\Delta_i$ is used: $p_\Delta = W_\Delta * \log(1 + \Delta_i)$, where $p_\Delta$ represents the projection of time gap information for the event, $W_\Delta \in \mathbb{R}^{d_2}$ represents a weight matrix that projects time gap $\Delta_i$ in a $d_2$ dimensional space. In certain examples, a transformation function, such as $f(x) = \log(1+x)$ is used to squash the larger values of time of occurrence information (e.g., time gap information), since time has a non-linear effect. The function described herein to determine the projection of time of occurrence information is an example and one or more other functions may be used other than or instead of the logarithmic transformation function.

In an example, the computer system concatenates, for the sequence of events and the time of occurrence information for the sequence, the respective dimensional vector representation and the respective projection of time of occurrence information for each event of the sequence of events. For example, the embedding layer 112 generates a concatenated embedding $p_i=[p_{e_i}, p_{\Delta_i}]$ for the $i_{th}$ event, where $p_{e_i}$ represents the respective dimensional vector representation for the $i_{th}$ event and $p_{\Delta_i}$ represents the projection of time of occurrence information for the $i_{th}$ event. The embedding $p_i$ represents the vector representation of the event in joint event-time space.

At 230, based upon the vector representations generated at 220, the neural network is configured to both (a) predict an event type for a next event to occur after the sequence of events and predict a time of occurrence indicative of when the next event will occur; and (b) perform a clustering operation on the sequence of events. In an example, the vector representations for each event (embeddings) are input to the RNN 115 of the neural network 111, and the RNN 115 is trained to perform the predicting and clustering operations.

In certain embodiments, the RNN 115 is a LSTM network that has been trained to perform the supervised learning task of predicting a next event (i.e., predict an event type for the next event and a time of occurrence of the next event). In an example, an updated hidden state from which an event type and a time of occurrence for a next event after a sequence of events can be projected is determined based on the hidden state of the neural network, cell state, and the input data. For example, the vector representations for each event, $p_i=[p_{e_i}, p_{\Delta_i}]$, are fed to the LSTM network as input, whose hidden states are then further used for the supervised prediction tasks. In an example, an updated hidden state or hidden activation ($h_i$) of the RNN 115 is used to predict an event type for a next event after a sequence of events and a time of occurrence for the next event. For example, a probability for each event type of a set of event types is determined and the event type with the highest probability is selected as the next event type. In an example, the probability of a next event being an event type k of a set of event types is determined as follows:

$$p(e_{i+1} = k \mid h_i, W_s, b) = \frac{\exp(W_{s,k} h_i + b_k)}{\sum_{k=1}^{n} \exp(W_{s,k} h_i + b_k)} \quad (1)$$

where $p(e_{i+i}=k)$ represents the probability p of next event $e_{i+1}$ being event type k, where $W_s$ represents a weight matrix, $h_i$ represents the updated hidden state, and $b_k$ represents a bias term. In an example, a probability for each event type is determined for the next event type. Equation (1) to determine a probability of a particular next event type is an example and one or more other functions may be used other than or instead of equation (1). In an example, the next event type prediction comprises the event type of the set of events having a highest probability is selected for the next event as the next event type prediction. In another example, the next event type prediction comprises a probability distribution of all event types for the next event. In an example, the neural network 111 is used to determine a time of occurrence for the next event after the sequence based on the updated hidden state. For example, the time of occurrence for the next event after the sequence may be determined by applying a weight matrix to the updated hidden state.

As part of the processing in 230, the neural network also performs a clustering operation on the sequence of events. In an example, the clustering operation is performed based on the updated hidden state of the neural network 111, or more specifically of the RNN 115. In an example, the clustering operation may comprise clustering the sequence of events into a pre-determined number of clusters and determining an affinity of the next event to each of the set of clusters. For example, a parameter K may be set to identify the number of clusters (e.g., K=1, 2, 3, . . . , m) with the cluster centers for the K clusters represented by ($\mu_1, \mu_2, \mu_3, \ldots \mu_K$), and cluster j with corresponding cluster center $\mu_j$ comprises one of the K clusters. Given an input point with embedding $h_i$, the affinity towards each cluster j (of a set of K clusters) can be given by an affinity function q( ):

$$q(h_i, \mu_j) = \frac{\left(1 + \frac{\|h_i - \mu_j\|^2}{a}\right)^{-1}}{\sum_{j=1}^{K} \left(1 + \frac{\|h_i - \mu_j\|^2}{a}\right)^{-1}} \quad (2)$$

Where $q(h_i, \mu_j)$ is the t-distribution kernel similarity from t-SNE, and conforms to the probability of $h_i$ belonging to cluster j, $h_i$ represents the updated hidden state of the neural network 111, $\mu_j$ represents a center of cluster j, a represents a variance of a Gaussian centered at the center of cluster j, and K represents the total number of clusters. While t-SNE uses a similarity between a pair of points to construct the neighborhood around one of the points, the techniques described herein calculate the similarity between a point with the cluster center. These soft assignments of clusters are then matched with an auxiliary distribution P. The method uses an auxiliary distribution P, with properties like increased cluster purity and avoiding large degenerate clusters as observed in other clustering algorithms such as k-means. In other words, a similarity between a point and a center of a particular cluster j is calculated. In certain examples, the affinity $q(h_i, \mu_j)$ determined via equation (2) may be normalized by a normalization factor f to determine a normalized target distribution $p(h_i, \mu_j)$ as follows:

$$p(h_i, \mu_j) = \frac{q(h_i, \mu_j)^2 / f_j}{\sum_{j=1}^{K} q(h_i, \mu_j)^2 / f_j} \quad (3)$$

where normalization penalizes for cluster size. In an example, the normalization factor $f_j$ is determined from the sum of the cluster affinities of the next event for each cluster, $f_j=\Sigma_i q(h_i, \mu_j)$. The functions described herein, equations (2)-(3) to determine cluster affinity and a normalized target distribution, are example and one or more other functions may be used instead of equations (2)-(3) to perform a clustering operation based on the updated hidden state of the neural network 111.

In 240, the information related to the next event prediction and the clustering operation are output to the user or may be provided to a downstream process that consumes this information. For example, the computer system 110 may cause a graphical user interface (GUI) to be displayed via an output device (e.g., a monitor) that outputs or displays information identifying the event type and time of occurrence associated with the next event prediction along with the clustering information for the sequence of events.

In certain instances, the computer system 110 uses the neural network 111 to generate multiple next event predictions (and corresponding event type and time of occurrence information for each next event prediction) for next events predicted to occur after a sequence of events and clustering information for the sequence of events.

In the embodiments described herein, the RNN 115 performs the clustering operation on a sequence of events and not on the next event prediction that is also an output of the RNN 115. However, in other embodiments, the clustering operation of the RNN 115 is also performed on one or more next event predictions (including event type and time of occurrence information) along with the sequence of events.

In certain embodiments, the computer system 110 may be configured to act on the next event prediction and/or the clustering information. In some other embodiments, the computer system 110 may provide the information to a consumer of the predicted and clustering information, and the consumer may then perform one or more actions responsive to the predicted and/or clustering information. For example, the computer system 110 may block access to one or more services, provides one or more services, or otherwise changes an interaction with a user computing device associated with a user via a network environment based on a predicted next event type, next event information, and/or clustering information for a sequence of events for the user. In an example, a downstream consumer of the clustering information, such as an interpreter of the clustering results information, may associate or assign labels or tags to the clusters. If the sequence of events corresponds to user behavior, these labels or tags may represent or identify certain categories of user behavior.

FIG. 3 depicts an example of a process for training a neural network (e.g., neural network 111 depicted in FIG. 1) to predict an event type and a time of occurrence for a next event after a sequence of events and to perform dynamic clustering for the sequence of events, according to certain embodiments. The processing depicted in FIG. 3 may be implemented in software (e.g., code, instructions, program) executed by one or more processing units (e.g., processors, cores of computer system 110 depicted in FIG. 1) of the respective systems, hardware, or combinations thereof. The software may be stored on a non-transitory storage medium (e.g., on a memory device). The process depicted in FIG. 3 and described below is intended to be illustrative and non-limiting. Although FIG. 3 depicts the various processing blocks occurring in a particular sequence or order, this is not intended to be limiting. In certain alternative embodiments, the blocks may be performed in some different order or some blocks may also be performed in parallel. In certain embodiments, such as in the embodiment depicted in FIG. 1, the processing depicted in FIG. 3 may be performed by the computer system 110. For illustrative purposes, the process 300 is described with reference to certain examples depicted in the figures. Other implementations, however, are possible.

In certain examples, the computer system 110 provides a training infrastructure that is used to train the neural network 111 (and RNN 115) over a training period using training data 118. Various hyperparameters 119 may be set to facilitate and guide the training. The training of the neural network 111 produces a unified model that can, given a sequence of events as input, predict a next event to occur after the sequence of events and to perform a clustering operation for the sequence of events. For example, the RNN 115 may be trained to perform the prediction and clustering operations performed in 230 in FIG. 2 and described above. In certain embodiments, the training of the neural network 111 involves training the embedding layer 112 to generate vector representations for the sequence of events, wherein the vector representation for an event provides an n-dimensional vector in joint event-time space. For purposes of simplicity, FIG. 3 focuses on training done for the predicting and clustering operations.

In certain examples, the RNN 115 comprises an LSTM network. The LSTM network can be represented by the following equations:

$$r_i = \sigma(W_r p_i + U_r h_{i-1} + b_r) \quad (4)$$

$$f_i = \sigma(W_f p_i + U_f h_{i-1} + b_f) \quad (5)$$

$$o_i = \sigma(W_o p_i + U_o h_{i-1} + b_o) \quad (6)$$

$$c_i = f_i \odot c_{i-1} + r_i \odot \tanh(W_c p_i + U_c h_{i-1} + b_c) \quad (7)$$

$$h_i = o_i \odot \tanh(c_i) \quad (8)$$

Example equation (4) represents an input gate of the LSTM, where $\sigma(\ldots)$ represents a sigmoid activation function, $W_r$ and $U_r$ represent weight matrices for the input gate, $b_r$ represents a bias term for the input gate, $h_{i-1}$ represents the current hidden state for the neural network, and $p_i$ represents the input data comprising the vector representations generated by the embedding layer 112.

Example equation (5) represents a forget gate of the LSTM, where $\sigma(\ldots)$ represents a sigmoid activation function, $W_f$ and $U_f$ represent weight matrices for the forget gate, $b_f$ represents a bias term for the forget gate, $h_{i-1}$ represents the current hidden state for the neural network, and $p_i$ represents the input data.

Example equation (6) represents an output gate of the LSTM, where $\sigma(\ldots)$ represents a sigmoid activation function, $W_o$ and $U_o$ represent weight matrices for the output gate, $b_o$ represents a bias term for the output gate, $h_{i-1}$ represents the current hidden state for the neural network, and $p_i$ represents the input data.

Example equation (7) represents determining an updated cell state $c_i$ of the LSTM neural network, where $f_i$ represents the output of equation (5), $c_{i-1}$ represents the current cell state, $r_i$ represents the output of equation (4), $\odot$ represents an Hadamard or element-wise product, $\tanh(\ldots)$ represents a hyperbolic tangent activation function, $W_c$ and $U_c$ represent weight matrices for updating the cell state, $b_c$ represents a bias term for updating the cell state, $h_{i-1}$ represents the current hidden state, and $p_i$ represents the input data.

Example equation (8) represents determining an updated hidden state $h_i$ of the LSTM cell, where $o_i$ represents the output of equation (6), $\odot$ represents an Hadamard or element-wise product, $\tanh(\ldots)$ represents a hyperbolic tangent activation function, and $c_i$ represents the updated cell state. Other neural network architectures may be used other than or in addition to the LSTM network architecture. The equations (4)-(8) described herein describing the neural network are example and one or more other functions may be used in addition to than or instead of any of the equations (4)-(8).

Training data 118 stored in the memory storage subsystem 116 may be used for training the neural network 111, including training the RNN 115. The training data may comprise various sequences of events comprising event type data and associated time of occurrence information, and for each sequence, a ground truth next event including the event type for the next event and a time of occurrence of the next event after the last event in the sequence of events. Training data is also used for training the neural network to perform a clustering operation for the sequence of events.

Various hyperparameters 119 may be specified for guiding the training operation such as, for example, a learning rate, a batch size, a cluster size, etc. During the training period, various techniques, such as back propagation and optimization techniques are used to optimize model parameters 117 of the neural network 111 and/or RNN 115, such as weights and bias terms. For example, for neural network 111 depicted in FIG. 1 that includes an RNN 115, one or more model parameters 117 of the RNN 115 (e.g., model parameters 117 related to input, forget, and output gates and model parameters 117 related to determining predictions from the updated hidden state) may be optimized. This optimization may be performed by minimizing a combined loss function to generate a unified model that can both predict a next event to occur after a sequence of events (including an event type for the next event and a time when the next event will occur) and also perform a clustering operation for the sequence of events.

In certain examples described herein, multiple loss functions are used, where the multiple loss functions include one or more loss functions for training the neural network for predicting the next event and one or more loss functions for the neural network to perform clustering. In certain embodiments, the multiple loss functions are combined into a combined loss function and, during the training period, the computer system 110 uses optimization techniques (e.g., back propagation techniques) to optimize the combined loss function, which in turns results in the weights and biases associated with the different layers of the neural network to be optimized for predicting the next event and performing the clustering operation. The processing depicted in FIG. 3 provides an example of a method that may be used to train the RNN 115 using a combined loss function determined based on the separate example loss functions described in blocks 310-340. Other loss functions may be used instead of or in addition to the example loss functions described in blocks 310-340. Further, the computer system 110 may use additional equations from those described herein, separate equations from those described herein, and/or modified equations with respect to those described herein in blocks 310-360 to determine a combined loss function. Also, the combined loss function may be determined based on additional loss functions, alternate loss functions, or an alternate combination of loss functions than those of the example combined loss function described in blocks 350-360.

At 310, the process 300 involves receiving information identifying a loss function for predicting an event type for a next event after a sequence of events. In an example, an operator of the computer system 110 determines the loss function for predicting the event type and inputs the loss function to the neural network 111. An example event type loss function comprises a negative log likelihood ("NLL") of an m length sequence of events:

$$\mathcal{L}_e = -\Sigma_{i=1}^m \Sigma_{k=1}^{|\mathbb{E}|} \mathbb{I}_{(e_{i+1}=k)} \log p(e_{i+1}=k|e_i, \theta) \quad (9)$$

where θ represents a set of training parameters in the training data 118 and $\mathbb{I}(e_{i+1}=k)$ represents an indicator function to encode a gold label ($\mathbb{I}(e_{i+1}=k)=1$) if a next event $e_{i+1}$ corresponds to event type k, where the gold label comprises labeled training data 118. In an example, the neural network 111 is trained by minimizing the NLL over a training period. The event type loss function minimizes a cross-entropy between a predicted next event type distribution and a ground truth distribution associated with the next event predicted to occur after the sequence of events. In certain examples, the loss function for predicting the next event type is a component of a combined loss function to train the RNN 115, as described in blocks 350-360 below.

At 320, the process 300 involves receiving information identifying a loss function for predicting a time of occurrence of a next event after a sequence of events. In an example, an operator of the computer system 110 determines the loss function for predicting a time of occurrence of a next event after a sequence of events inputs the loss function to the neural network 111. An example next time of occurrence loss function, assuming the time of occurrence is expressed as a time gap, is as follows:

$$\mathcal{L}_g = \frac{(\Delta_{i+1} - W_g * h_i)^2}{2\sigma^2} \quad (10)$$

where $W_g$ represents a weight matrix that transforms the updated hidden state $h_i$ of the neural network 111 to a time space (e.g. a time gap space) and a represents σ normalizing factor to ensure a stable training with the event type prediction described in block 310.

At 330, the process 300 involves receiving information indicating a loss function for performing a clustering operation on a sequence of events that takes into account a hidden state. An example clustering loss function is determined based on a KL-divergence function KL( ) of the cluster affinity distribution $P=p(h_i, \mu_j)$ of example equation (2) and the target distribution $Q=q(h_i, \mu_j)$ of example equation (3):

$$\mathcal{L}_c = KL(P\|Q) = \Sigma_i \Sigma_j p(h_i, \mu_j) \log \frac{p(h_i, \mu_j)}{q(h_i, \mu_j)} \quad (11)$$

In an example, the pre-determined number of clusters used to generate clustering output on a clustering operation for a sequence of events is tuned as a hyper-parameter decided by the minimum loss on the training data set.

At 340, the process 300 involves receiving information indicating a regularization loss function. In an example, an operator of the computer system 110 determines the regularization loss function and inputs the loss function to the neural network 111. Application of an example regularization function reduces abrupt changes in clusters of consecutive events in sequences of events. For example:

$$\mathcal{L}_r = \lambda_r \|q(h_i, \mu) - q(h_{i-1}, \mu)\|_2^2 \quad (12)$$

represents an example regularization loss function where $q(h_i, \mu)$ represents a target distribution of current cluster assignments (based on the updated hidden state data), $q(h_{i-1}, \mu)$ represents a target distribution of cluster assignments at the previous event of the sequence (based on the previous hidden state data), and $\Delta_T$ represents a regularization constant and L2 norm is calculated between the consecutive cluster assignments.

At 350, the process 300 involves combining each of the determined loss functions to form a combined loss function. In another example, instead of receiving information indicating separate loss functions as described in blocks 310-340 and combining the separate loss functions to form a combined loss function, the computer system 110 receives information indicating the combined loss function. In this other example, an operator of the computer system 110 determines the combined loss function and inputs the combined loss function to the neural network 111. The computer system 110 may combine the loss functions described in blocks 310-340 into a combined loss function optimized across n user sequences as follows:

$$\mathcal{L}_{combined} = \Sigma_{u=1}^{n} \mathcal{L}_e + \mathcal{L}_g + \mathcal{L}_c + \mathcal{L}_r \quad (13)$$

For example, the combined loss function comprises a sum of the loss function for determining an event type for a next event after a sequence of events, the loss function for determining a time of occurrence for the next event after the sequence of events, the loss function for performing the clustering operation for the sequence of events, and the regularization loss function. The combined loss function of equation (13) is an example and other combined loss functions may be used, depending on which individual loss functions are being used by the neural network 111.

At 360, the process 300 involves training the RNN 115 using the combined loss function generated in 350 to generate a unified model. In an example, during the training phase, the neural network 111 is trained by minimizing or optimizing the combined loss function. During the training period, the computer system 110 may provide a training information that is used to train the neural network 111. As part of the processing in 360, one or more optimization techniques (e.g., back propagation techniques) may be used to iteratively train the neural network 111 while optimizing the combined loss function, which involves optimizing the individual loss functions in the combined loss function As part of the optimization, weights and biases associated with different layers of the RNN 115 may be changed such that the errors in the prediction of the next event and the clustering results is minimized. In some examples, the computer system 110 trains the RNN 115 over the training period by optimizing model parameters 117 to minimize the combined loss function. In another example, the computer system 110 trains the neural network over the training period by optimizing the model parameters 117 to minimize the combined loss function and one or more other loss functions. In an example, over the training period, the computer system 110 trains the neural network 111 and the RNN 115 according to hyperparameters information 119 retrieved from the memory storage subsystem 116. The computer system 110 may optimize one or more model parameters 117 of the RNN 115 relevant to determining an event type for a next event following a sequence of events, determining the time of occurrence for the next event, or performing the clustering operation for the sequence of events over the training period in accordance with the hyperparameters information 119 in order to minimize the combined loss function. For example, model parameters 117 of the RNN 115 comprising an LSTM network comprise one or more of (A) weight matrices, bias terms, or other model parameters 117 described in equations (4)-(8) representing an architecture of the RNN 115; (B) weight matrices and bias terms described in equation (1) representing a function to determine the probability of a next event type; (C) the weight matrix and normalization factor described in equation (10) representing a function to determine the loss function for a time of occurrence for the next event after the sequence of events; (D) a number K of clusters, a position of cluster center $\mu_j$ of one or more clusters j, and a normalization factor $f_j$ as described in equations (2)-(3) representing functions to determine a cluster affinity distribution and a target distribution.

The neural network architecture described herein is example and other or additional appropriate model parameters 117 may be updated depending on the specific architecture of neural network 111 utilized, which may or may not correspond to the example LSTM network architecture described in equations (4)-(8) and block 230.

For illustration purposes, the examples provided and described above are directed to sequences of events describing human behavior (e.g. user interaction with a service such as a tutorial via a user interface). This, however, is not intended to be limiting. The predictive functionality of the neural network 111 can also be applied to various other types of situations and associated sequences of events including sequences of natural phenomena. Compared to conventional supervised learning models for next event prediction (including an event type and a time of occurrence of a next event after a sequence of events), using the neural network 111 applying the unified model described herein performs as well as the conventional supervised learning models. To test the effective of the unified model, for a given sequence of events, the performance and output generated using the unified model described herein was compared to some conventional techniques. The unified model described herein (neural network 111) was compared against a conventional LSTM. Further, the unified model described herein was compared against a conventional variational recurrent neural network implementation ("VRNN") and conventional mixture density network ("MDN") models developed concurrently with the unified model with respect to performance over supervised learning tasks of event type and time of occurrence predictions for a next event after a sequence of events. The MDN model combines a conventional neural network (in this case, an LSTM) with a mixture density model and determines static clusters based on a time of occurrence prediction from the LSTM output using a Gaussian mixture likelihood. The VRNN predicts a next event time gap for a next event and a next event type and determines static clusters based on the next event prediction using a Gaussian mixture likelihood and Gaussian mixture weights. For the MDN and VRNN models, the respective models were configured for next event predictions and included a Gaussian mixture likelihood to learn clusters over the time-gap prediction from the LSTM output and, when compared against ground truth values, the results were observed for each of the models:

TABLE 1

| Method | Data Set 1 | | Data Set 2 | | Data Set 3 | |
| --- | --- | --- | --- | --- | --- | --- |
| | Accuracy | Δ RMSE | Accuracy | Δ RMSE | Accuracy | Δ RMSE |
| LSTM | 34.96% | 2056.98 | 54.23% | 234.4 | 56.98% | 190.4 |
| VRNN | 33.45% | 2543.23 | 43.90% | 260.2 | 37.83% | 213.6 |
| MDN | 32.78% | 2009.37 | 40.29% | 227.9 | 32.19% | 173.5 |
| Unified model | 34.99% | 2065.44 | 54.19% | 233.1 | 56.16% | 188.7 |

In Table 1, the accuracy represents the number of correctly identified event type predictions divided by the total number of events and Δ RMSE represents the root mean square error of time of occurrence predictions (in the form of time gap predictions). As can be seen from the results shown in Table 1, the neural network 111 with RNN 115 applying the unified model described herein (the "unified model" referenced in Table 1) performs comparably with the conventional LSTM model, which is unable to perform clustering (unsupervised learning) operations, and is superior to the MDN and VRNN models, which are able to perform clustering operations. Compared to conventional models capable of performing clustering operations (unsupervised learning), the neural network 111 with RNN 115 (comprising an LSTM) applying the unified model described herein performs better than the VRNN and MDN models referenced in Table 1. A qualitative analysis of clustering operations showed degenerate clusters output by the clustering operations of both the VRNN and MDN models for the three data sets referenced in Table 1 (the conventional LSTM model does not perform clustering). The qualitative analysis showed clusters having little variation in membership probabilities (affinities). On the contrary, clusters output via the clustering operation using the unified model described herein produced, for the three data sets referenced in Table 1, cluster outputs had greater variation in membership probabilities than conventional models and, therefore, were interpretable and able to be labeled with user behavior labels.

As shown by these results, the unified model approach (using the neural network 111 with RNN 115 described herein) is superior to a conventional LSTM approach because it performs clustering operations that the conventional LSTM approach is unable to perform and provides next event predictions with comparable accuracy to the accuracy of the conventional LSTM approach.

Further, the unified model approach described herein is superior to alternative approaches that are able to perform both clustering operations and next event predictions (such as VRNN and MDN approaches) that were developed and tested. Particularly, the next event predictions of the unified model approach are more accurate than the VRNN and MDN approaches and the clustering output of the unified model approach is qualitatively superior to the clustering output of the VRNN and MDN approaches. Unlike the conventional approaches, in the unified model approach described herein, the next event prediction task provides a teaching signal to the clustering operation task in that the clustering operation and the next event prediction are performed based on a shared hidden state (or hidden activation). The output generated by the unified model described herein is superior to conventional approaches. For example the computer system 110 could receive a sequence of events comprising a user's interaction with an online tutorial provided by the computer system 110, for example a series of clicks, inputs or other interactions of the user with the online tutorial. Based on the sequence of events, the unified model predicts a next event after the sequence of events for the user, including an event type and a time of occurrence for the next event. For example, the sequence of events comprises a series of clicks within a tutorial module and the predicted next event comprises clicking a user interface object to complete the tutorial module at a predicted time. Further, as output for the dynamic clustering operation, the unified model determines a user's affinity for each of three cluster groups for each event of the sequence of events.

Figure 6:
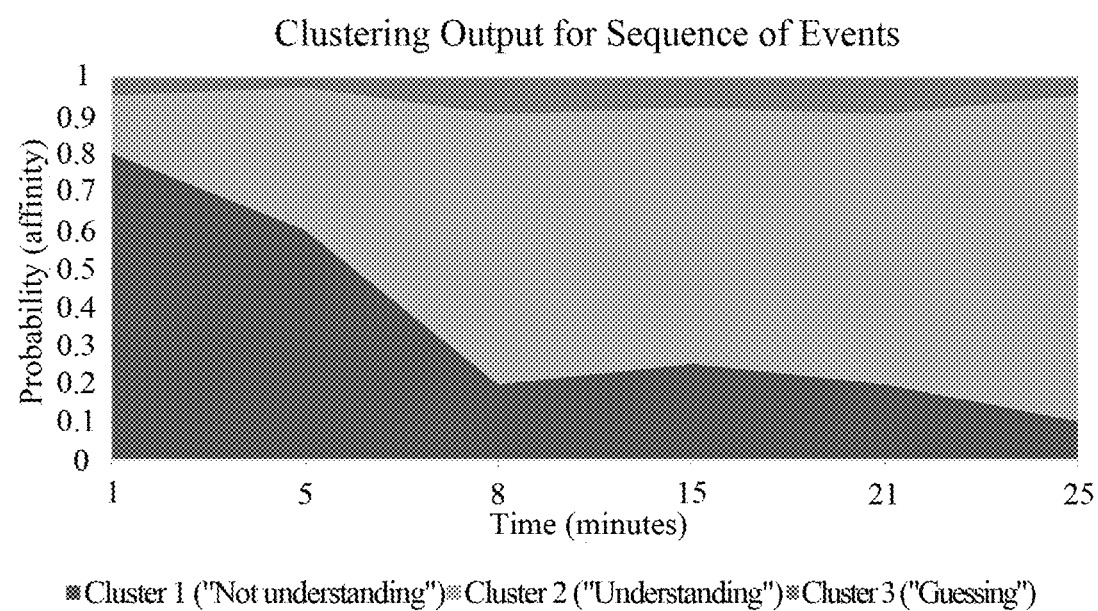
FIG. 6 depicts an example graphical illustration of a clustering output of a neural network for a first user, according to certain embodiments disclosed herein.

FIG. 6 is an example graphical illustration of a clustering output of a neural network for a first user, according to certain embodiments disclosed herein. The unified model provides, unlike conventional approaches that only output static clustering output and do not consider time of occurrence information, dynamic clustering output that comprises, for each event in the sequence of events, cluster affinities to each of a stable set of clusters. The RNN 115 may output clustering information in appropriate formats, for example, a table (or matrix) of cluster affinities where each row of table represents an event of the sequence of events, each column represents a cluster identifier, and the values of the cells represent cluster affinities. The computer system 110 may output the cluster affinities over the sequence of events using graphs (as shown in FIG. 6), heat maps, or other appropriate visual representation.

The example clustering output of FIG. 6 may be determined for a sequence of events comprising a series of clicks of the first user within an online tutorial module. The sequence of events may comprise, for each event of the sequence of events, an event type identifier and an associated time of occurrence. For example, the sequence of events comprises {(A, 1:00), (A, 5:00), (B, 8:00), (C, 15:00), (B, 21:00), (A, 25:00)}, where A, B, and C indicate event type identifiers and M:SS (e.g. 1:00) indicates that M minutes and SS seconds have passed since an initial event (e.g. a beginning of the online tutorial). For example, event type A indicates a selection of a first user interface object in the online tutorial, event type B indicates a selection of a second user interface object in the online tutorial, and event type C indicates a selection of a third user interface object in the online tutorial. As output for the clustering operation, the unified model determines the first user's affinity for each of three cluster groups for each event of the sequence of events. In the example clustering output shown in FIG. 6, an operator of the computer system 110 viewing the clustering output may observe a cluster affinity (indicated on the y-axis) for three clusters over the sequence of events (indicated by time of occurrence associated with each event on the x-axis) for a second cluster over a sequence of events increase while the cluster affinity for a first cluster decreases over the sequence of events and a cluster affinity for a third cluster remains stable over the sequence of events. The example graphical representation of clustering output illustrated in FIG. 6 comprises cluster affinities graphed at time gaps of the sequence of events. For example, the x-axis of the graph represented in FIG. 6 represents a measure of time gap (in minutes) of each event in the sequence of events and the y-axis represents a cluster probability (between 0 and 1) of being clustered into a particular cluster. For the example depicted in FIG. 6, the number of clusters ("k") is preset to three. Cluster probabilities for the three clusters are shown in the graphical representation of the clustering output. The clusters may be labeled or unlabeled. For example, just the number of clusters is sufficient for the processing and there is no requirement to associate the clusters with labels that impart some meaning to the clusters. In other embodiments, labels may be associated with the clusters, where a label associated with a cluster indicates some characteristic (or characteristics) of the cluster. For example, for the cluster result shown in FIG. 6, an operator of the unified model may associate labels with the three clusters as shown in FIG. 6, where the labels identify a behavior trait of the user whose actions have resulted in the sequence of event being clustered. For example, in FIG. 6, namely, the first cluster is labeled "Not Understanding," the second cluster is labeled "Understanding," and the third cluster is labeled "Guessing." It can be observed from the clustering output depicted in FIG. 6 that the first user's affinity for the "Understanding" cluster has increased over the sequence of events while an affinity for the "Not Understanding" behavior cluster has decreased over the sequence and an affinity for the "Guessing" behavior cluster has remained stable over the sequence. In addition to the clustering output in FIG. 6 associated with the example sequence of events {(A, 1:00), (A, 5:00), (B, 8:00), (C, 15:00), (B, 21:00), (A, 25:00)}, the unified model also provides a next event prediction including an event type and a time of occurrence. For example, the next event prediction for the sequence of events may comprise (B, 28:00), meaning the next event prediction is that event type B will occur at 28 minutes from the beginning of the first user's interaction with the online tutorial, where event type B is a selection by the first user of the second user interface object in the tutorial. In this example, the next event type corresponds to an event type in the sequence that has previously occurred. In other examples, however, the next event type may be different from event types in the sequence of events. In another example, the next event prediction for the sequence of events comprises (D, 29:00), where event type D is a selection of a user interface object to complete the online tutorial that is predicted to occur at 29 minutes after the first user began the online tutorial.

The example dynamic clustering output depicted in FIG. 6 can be used for various different purposes, such as to analyze and understand the behavior of the user whose actions while browsing a website generated the sequence of events for which the clustering operation was performed. For example, the clustering results depicted in FIG. 6 show that the first user's understanding increased with time, but the first user was still doing a consistent level of guessing. This output and understanding can then be used to make decisions concerning how to modify the website (or online tutorial or other appropriate content) to reduce the guessing and further improve the rate of the user's understanding. This was not possible with clustering operations performed by conventional clustering approaches that were not able to generate clustering output that took into consideration the times (e.g., time gaps) associated with the events in the sequence of events. Conventional clustering approaches only modeled individual events in a sequence without considering time between events (e.g., time gaps). In addition to the dynamic clustering output of a sequence of events as depicted in FIG. 6, the unified model also outputs a next event prediction including a time of occurrence for a next event after the sequence of events and an event type for the next event after the sequence of events for the first user.

Figure 7:
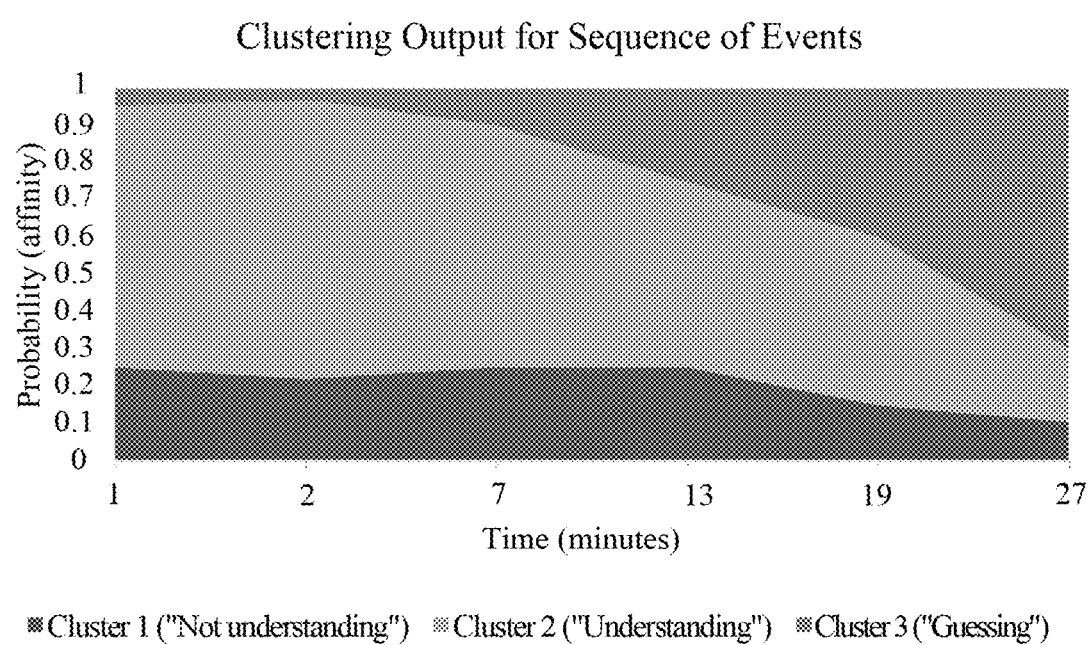
FIG. 7 depicts an example graphical illustration of a clustering output of a neural network for a second user, according to certain embodiments disclosed herein.

FIG. 7 is an example graphical illustration of a clustering output of a neural network for a second user, according to certain embodiments disclosed herein. The particular user associated with the example clustering output of FIG. 7 is a second user different from the first user associated with the example clustering output of FIG. 6. The example clustering output of FIG. 7, similarly to the example described in FIG. 6, may be determined for a sequence of events comprising a series of clicks within a tutorial module. The sequence of events may comprise, for each event of the sequence of events, an event type identifier and an associated time of occurrence. For example, the sequence of events for the second user comprises {(B, 1:00), (B, 2:00), (C, 7:00), (A, 13:00), (A, 19:00), (A, 27:00)}, where A, B, and C indicate event type identifiers and M:SS (e.g. 1:00) indicates that M minutes and SS seconds (e.g. 1 minute and 0 seconds) have passed since an initial event (e.g. a beginning of the online tutorial). For example, event type A indicates a selection of a first user interface object in the online tutorial, event type B indicates a selection of a second user interface object in the online tutorial, and event type C indicates a selection of a third user interface object in the online tutorial. As output for the clustering operation, the unified model determines the second user's affinity for each of three cluster groups for each event of the sequence of events. In the example clustering output shown in FIG. 7, an operator of the computer system 110 viewing the clustering output may observe a cluster affinity (indicated on the y-axis) for three clusters over the sequence of events (indicated by time of occurrence associated with each event on the x-axis) In the example clustering output shown in FIG. 7, the operator of the computer system 100 viewing the clustering output observes a cluster affinity for a second cluster over a sequence of events decrease substantially while the cluster affinity for a first cluster decreases moderately over the sequence of events and a cluster affinity for a third cluster increases substantially over the sequence of events. The example graphical representation of clustering output illustrated in FIG. 7 for the second user comprises cluster affinities graphed at time gaps (1, 2, 7, 13, 19, and 27 minutes) of the sequence of events that are different from the time gaps for the cluster affinities for the first user (1, 5, 8, 15, 21, and 25 minutes) shown in FIG. 6. For example, the x-axis of the graph represented in FIG. 7 represents a measure of time gap (in minutes) of each event in the sequence of events and the y-axis represents a cluster probability (between 0 and 1) of being clustered into a particular cluster. For the example depicted in FIG. 7, the number of clusters ("k") is preset to three. Cluster probabilities for the three clusters are shown in the graphical representation of the clustering output. The clusters may be labeled or unlabeled. For example, just the number of clusters is sufficient for the processing and there is no requirement to associate the clusters with labels that impart some meaning to the clusters. In other embodiments, labels may be associated with the clusters, where a label associated with a cluster indicates some characteristic (or characteristics) of the cluster. For example, for the cluster result shown in FIG. 7, an operator of the computer system 100 may associate labels with the three clusters as shown in FIG. 7, where the labels identify a behavior trait of the second user whose actions have resulted in the sequence of event being clustered. For example, in FIG. 7, namely, the first cluster is labeled "Not Understanding," the second cluster is labeled "Understanding," and the third cluster is labeled "Guessing." It can be observed from the clustering output depicted in FIG. 7 that the second user's affinity for the "Understanding" cluster has decreased over the sequence of events while an affinity for the "Not Understanding" behavior cluster has decreased slightly over the sequence and an affinity for the "Guessing" behavior cluster has increased over the sequence. In addition to the clustering output in FIG. 7 associated with the example sequence of events {(B, 1:00), (B, 2:00), (C, 7:00), (A, 13:00), (A, 19:00), (A, 27:00)}, the unified model also provides a next event prediction including an event type and a time of occurrence. For example, the next event prediction for the sequence of events may comprise (B, 29:00), meaning the next event prediction is that event type B will occur at 29 minutes from the beginning of the second user's interaction with the online tutorial, where event type B is a selection by the second user of the second user interface object in the tutorial. In this example, the next event type corresponds to an event type in the sequence that has previously occurred. In other examples, however, the next event type may be different from event types in the sequence of events. In another example, the next event prediction for the sequence of events comprises (D, 30:00), where event type D is a selection of a user interface object to complete the online tutorial that is predicted to occur at 30 minutes after the second user began the online tutorial.

The example dynamic clustering output depicted in FIG. 7 can be used various different purposes, such as to analyze and understand the behavior of the second user whose actions while browsing a website generated the sequence of events for which the clustering operation was performed. For example, the clustering results depicted in FIG. 7 show that the first user's understanding behavior decreased substantially with time as guessing behavior increased substantially and not-understanding behavior decreased slightly.

This interpretation can then be used to make decisions concerning how to modify the website (or online tutorial or other appropriate content) to reduce the guessing and further improve the rate of the second user's understanding. This was not possible with clustering operations performed by conventional clustering approaches that were not able to generate clustering output that took into consideration the times (e.g., time gaps) associated with the events in the sequence of events. Conventional clustering approaches only modeled individual events in a sequence without considering time between events (e.g., time gaps). In addition to the dynamic clustering output of a sequence of events as depicted in FIG. 7, the unified model also outputs a next event prediction including a time of occurrence for a next event after the sequence of events and an event type for the next event after the sequence of events for the second user.

Examples of Computing Environments for Implementing Certain Embodiments

Figure 4:
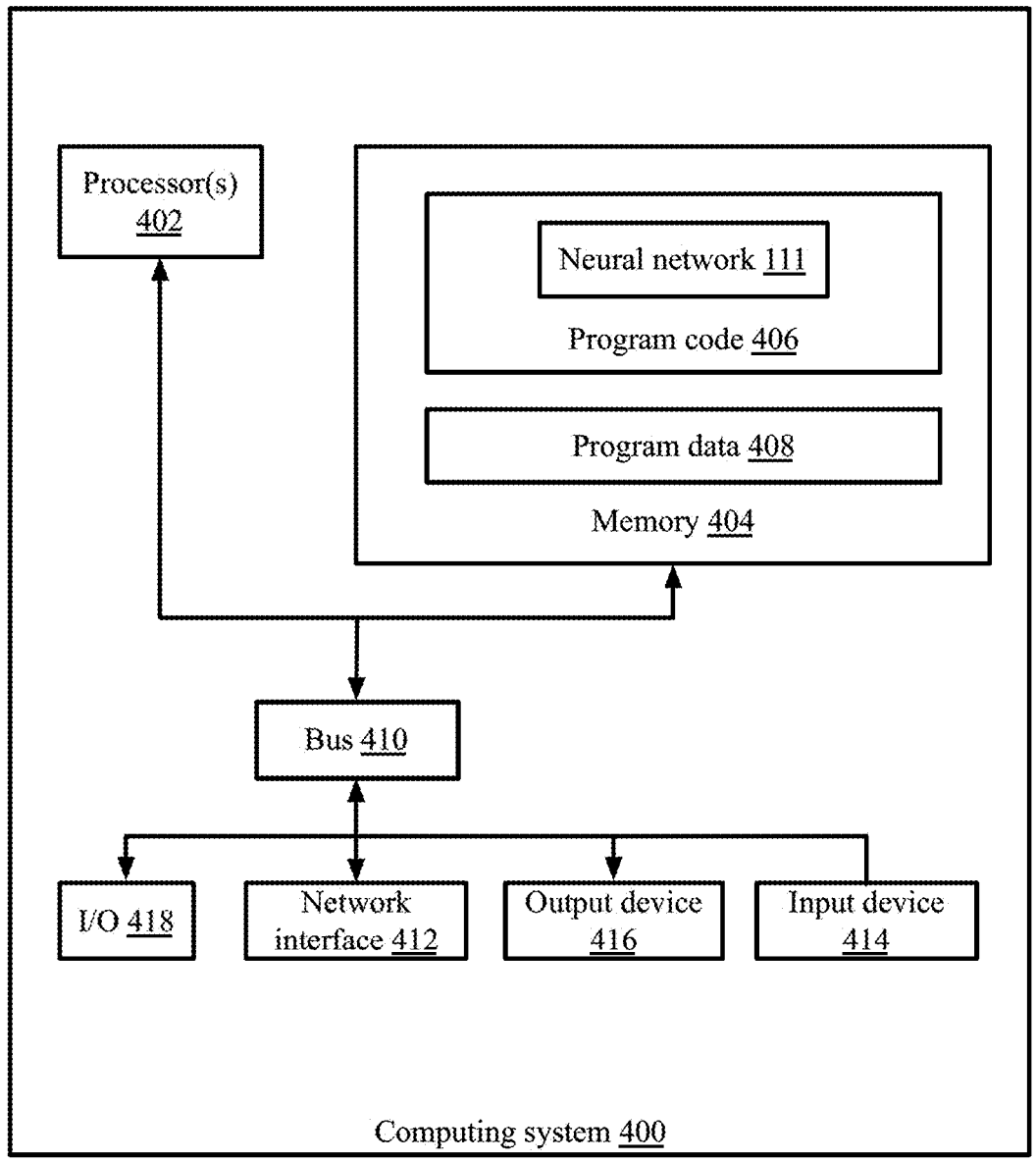
FIG. 4 depicts an example of a computer system for implementing certain embodiments disclosed herein.

Any suitable computer system or group of computer systems can be used for performing the operations described herein. For example, FIG. 4 depicts an example of a computer system 400. The depicted example of the computer system 400 includes a processor 402 communicatively coupled to one or more memory devices 404. The processor 402 executes computer-executable program code stored in a memory device 404, accesses information stored in the memory device 404, or both. Examples of the processor 402 include a microprocessor, an application-specific integrated circuit ("ASIC"), a field-programmable gate array ("FPGA"), or any other suitable processing device. The processor 402 can include any number of processing devices, including a single processing device.

The memory device 404 includes any suitable non-transitory computer-readable medium for storing program code 406, program data 408, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 404 can be volatile memory, non-volatile memory, or a combination thereof.

The computer system 400 executes program code 406 that configures the processor 402 to perform one or more of the operations described herein. Examples of the program code 406 include, in various embodiments, neural network 111, which may include any other suitable systems or subsystems that perform one or more operations described herein (e.g., one or more neural networks, encoders, attention propagation subsystem and segmentation subsystem). The program code 406 may be resident in the memory device 404 or any suitable computer-readable medium and may be executed by the processor 402 or any other suitable processor.

The processor 402 is an integrated circuit device that can execute the program code 406. The program code 406 can be for executing an operating system, an application system or subsystem, or both. When executed by the processor 402, the instructions cause the processor 402 to perform operations of the program code 406. When being executed by the processor 402, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 404 store the program data 408 that includes one or more datasets described herein. In some embodiments, one or more of data sets are stored in the same memory device (e.g., one of the memory devices 404). In additional or alternative embodiments, one or more of the programs, data sets, models, and functions described herein are stored in different memory devices 404 accessible via a data network. One or more buses 410 are also included in the computer system 400. The buses 410 communicatively couple one or more components of a respective one of the computer system 400.

In some embodiments, the computer system 400 also includes a network interface device 412. The network interface device 412 includes any device or group of devices suitable for establishing a wired or wireless data connection to one or more data networks. Non-limiting examples of the network interface device 412 include an Ethernet network adapter, a modem, and/or the like. The computer system 400 is able to communicate with one or more other computing devices via a data network using the network interface device 412.

The computer system 400 may also include a number of external or internal devices, an input device 414, a presentation device 416, or other input or output devices. For example, the computer system 400 is shown with one or more input/output ("I/O") interfaces 418. An I/O interface 418 can receive input from input devices or provide output to output devices. An input device 414 can include any device or group of devices suitable for receiving visual, auditory, or other suitable input that controls or affects the operations of the processor 402. Non-limiting examples of the input device 414 include a touchscreen, a mouse, a keyboard, a microphone, a separate mobile computing device, etc. A presentation device 416 can include any device or group of devices suitable for providing visual, auditory, or other suitable sensory output. Non-limiting examples of the presentation device 416 include a touchscreen, a monitor, a speaker, a separate mobile computing device, etc.

Although FIG. 4 depicts the input device 414 and the presentation device 416 as being local to the computer system 100, other implementations are possible. For instance, in some embodiments, one or more of the input device 414 and the presentation device 416 can include a remote client-computing device that communicates with computer system 110 via the network interface device 412 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 5:
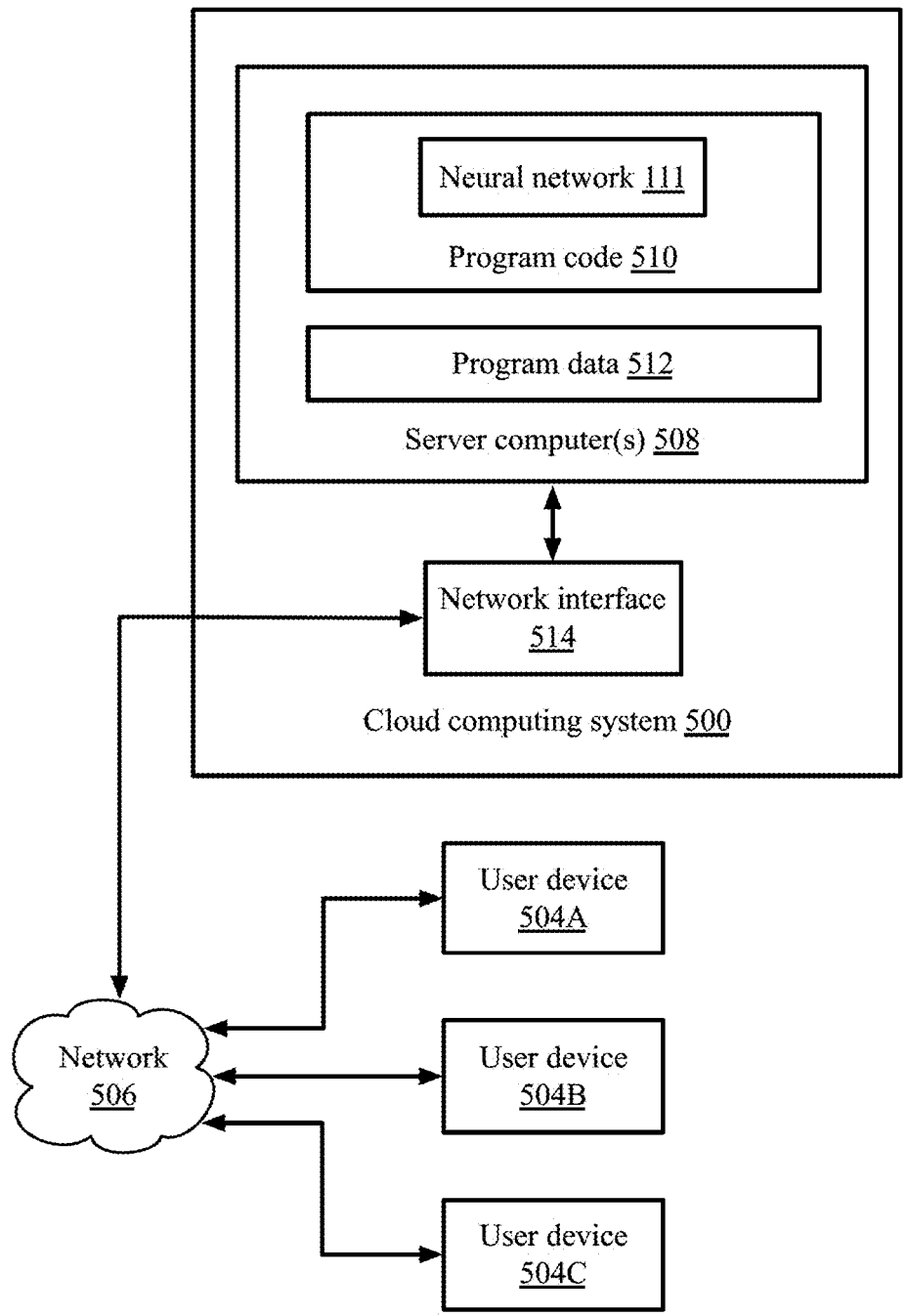
FIG. 5 depicts an example of a cloud computer system for implementing certain embodiments disclosed herein.

In some embodiments, the functionality provided by computer system 110 may be offered as cloud services by a cloud service provider. For example, FIG. 5 depicts an example of a cloud computer system 500 offering a next event prediction and dynamic clustering service that can be used by a number of user subscribers using user devices 504A, 504B, and 504C across a data network 506. In the example, the next event prediction and dynamic clustering service may be offered under a Software as a Service (SaaS) model. One or more users may subscribe to the next event prediction and dynamic clustering service, and the cloud computer system 500 performs the processing to provide the next event prediction and dynamic clustering service to subscribers. The cloud computer system 500 may include one or more remote server computers 508.

The remote server computers 508 include any suitable non-transitory computer-readable medium for storing program code 510 (e.g., neural network 111) and program data 512, or both, which is used by the cloud computer system 500 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 508 can include volatile memory, non-volatile memory, or a combination thereof.

One or more of the server computers 508 execute the program code 510 that configures one or more processors of the server computers 508 to perform one or more of the operations that provide video frame segmenting services, including the ability to perform both fast and accurate video semantic segmentation using a set of temporally distributed neural networks. As depicted in the embodiment in FIG. 5, the one or more servers providing the services to generate next event prediction and dynamic clustering may implement neural network 111. Any other suitable systems or subsystems that perform one or more operations described herein (e.g., one or more development systems for configuring an interactive user interface) can also be implemented by the cloud computer system 500.

In certain embodiments, the cloud computer system 500 may implement the services by executing program code and/or using program data 512, which may be resident in a memory device of the server computers 508 or any suitable computer-readable medium and may be executed by the processors of the server computers 508 or any other suitable processor.

In some embodiments, the program data 512 includes one or more datasets and models described herein. Examples of these datasets include segmented video frames. In some embodiments, one or more of data sets, models, and functions are stored in the same memory device. In additional or alternative embodiments, one or more of the programs, data sets, models, and functions described herein are stored in different memory devices accessible via the data network 506.

The cloud computer system 500 also includes a network interface device 514 that enable communications to and from cloud computer system 500. In certain embodiments, the network interface device 514 includes any device or group of devices suitable for establishing a wired or wireless data connection to the data networks 506. Non-limiting examples of the network interface device 514 include an Ethernet network adapter, a modem, and/or the like. The next event prediction and dynamic clustering service is able to communicate with the user devices 504A, 504B, and 504C via the data network 506 using the network interface device 514.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A computer-implemented method, comprising:
   training a neural network implemented using instructions executed by one or more computer systems to generate a trained model, wherein the neural network is trained to determine a training prediction, using a particular hidden state determined via the neural network for an input sequence of training events,
   wherein training the neural network includes optimizing a plurality of loss functions comprising:
   (1) a first loss function for determining a next training event to occur after the input sequence of training events, the next training event included in the training prediction,
   (2) a second loss function for determining a predicted training time of the next training event, the predicted training time included in the training prediction, and
   (3) a third loss function for determining a plurality of clusters including a respective cluster affinity distribution for each training event in the input sequence of training events, the respective cluster affinity distribution included in the training prediction;
   providing, by the one or more computer systems, sequence information for a sequence of events as input to the trained model, the sequence information comprising, for each event of the sequence of events, information identifying an event type for the event and time information for the event indicative of when the event occurred, wherein the event type is selected from a set of event types;
   generating, by the trained model executed by the one or more computer systems, for each event of the sequence of events, a vector representation for the event, the vector representation for the event including a representation of the event type for the event and a representation of the time information for the event, wherein the vector representation represents a point in a joint event-time space; and
   generating, by the trained model executed by the one or more computer systems and based upon the vector representations for the sequence of events, predictive information comprising (1) a prediction of a next event to occur after the sequence of events, the prediction of the next event comprising (i) a predicted event type for the next event selected from the set of event types and (ii) a predicted time indicative of when the next event will occur and (2) clustering information resulting from clustering the sequence of events into a pre-specified number of clusters,
   wherein the clustering information comprises, for each event of the sequence of events, a plurality of affinities of the each event to each cluster of the pre-specified number of clusters, wherein the plurality of affinities includes a respective affinity of the each event to each respective cluster of the pre-specified number of clusters.

2. The computer-implemented method of claim 1,
   wherein generating the predictive information comprises using the optimized plurality of loss functions to determine:
   via the first loss function, the predicted event type for the next event to occur after the sequence of events;
   via the second loss function, the predicted time for the next event to occur after the sequence of events; and
   via the third loss function, the clustering information resulting from clustering the sequence of events.

3. The computer-implemented method of claim 1, wherein the time information for each event of the sequence of events comprises a time stamp indicative of a time of occurrence of the event.

4. The computer-implemented method of claim 3, further comprising:
for at least one event of the sequence of events, converting, by the one or more computer systems, the time information for the at least one event to a time gap information indicating a length of time between occurrence of the at least one event and occurrence of an additional event adjacent to the at least one event of the sequence of events and occurring before the at least one event.

5. The computer-implemented method of claim 1, wherein:
for at least one event of the sequence of events, the time information for the at least one event specifies a time gap information indicating a length of time between occurrence of the at least one event and occurrence of an additional event adjacent to the at least one event of the sequence of events and occurring before the at least one event.

6. The computer-implemented method of claim 1, wherein generating the predictive information comprises:
using, by the trained model executed by the one or more computer systems, a hidden state of the neural network.

7. The computer-implemented method of claim 1, wherein generating, for each event of the sequence of events, the vector representation comprises:
encoding, using an embedding matrix of an embedding layer, each event of the sequence of events into a first dimensional space to generate the vector representation; and
embedding, using the embedding layer, the representation of the time information into a second dimensional space using an embedding weight matrix and a logarithmic transformation function.

8. The computer-implemented method of claim 1, wherein generating, for each event of the sequence of events, the vector representation comprises:
generating, by the neural network executed by the one or more computer systems, a first representation based upon the event type for the event;
generating, by the neural network executed by the one or more computer systems, a second representation based upon the time information for the event; and
generating, by the neural network executed by the one or more computer systems, the vector representation based upon the first representation and the second representation.

9. The computer-implemented method of claim 1, wherein:
generating, for each event of the sequence of events, the vector representation comprises generating the vector representation using a first set of one or more layers of the neural network; and
generating the prediction of the next event and the clustering information comprises using a second set of one or more layers of the neural network, wherein the second set of one or more layers is different from the first set of one or more layers.

10. The computer-implemented method of claim 9, wherein the second set of one or more layers correspond to a long short term memory ("LSTM") network.

11. The computer-implemented method of claim 1, wherein the neural network comprises one or more of a long short term memory ("LSTM") network, a gated recurrent unit ("GRU") network, a variational recurrent neural network ("VRNN"), or a mixture density network ("MDN").

12. The method of claim 1, further comprising generating a visual representation of the clustering information, wherein the visual representation includes, for each event of the sequence of events, a respective visual representation region for the respective affinity of the each event to the each respective cluster.

13. A system, comprising:
one or more processors; and
a non-transitory computer-readable medium communicatively coupled to the one or more processors, the non-transitory computer-readable medium storing program code executable by the one or more processors, the program code comprising instructions that when executed by the one or more processors cause the one or more processors to perform operations comprising:
training a neural network implemented using instructions executed by one or more computer systems to generate a trained model, wherein the neural network is trained to determine a training prediction, from a particular hidden state determined via the neural network for an input sequence of training events,
wherein training the neural network includes optimizing a plurality of loss functions comprising:
(1) a first loss function for determining a next training event to occur after the input sequence of training events, the next training event included in the training prediction,
(2) a second loss function for determining a predicted training time of the next training event, the predicted training time included in the training prediction, and
(3) a third loss function for determining a plurality of clusters including a respective cluster affinity distribution for each training event in the input sequence of training events, the respective cluster affinity distribution included in the training prediction;
providing sequence information for a sequence of events as input to the trained model, the sequence information comprising, for each event of the sequence of events, information identifying an event type for the event and time information for the event indicative of when the event occurred, wherein the event type is selected from a set of event types;
generating, by the trained model, for each event of the sequence of events, a vector representation for the event, the vector representation for the event including a representation of the event type for the event and a representation of the time information for the event, wherein the vector representation represents a point in a joint event-time space; and
generating, by the trained model and based upon the vector representations for the sequence of events, predictive information comprising (1) a prediction of a next event to occur after the sequence of events, the prediction of the next event comprising (i) a predicted event type for the next event selected from the set of event types and (ii) a predicted time indicative of when the next event will occur and (ii)(2) clustering information resulting from clustering the sequence of events into a pre-specified number of clusters, wherein the clustering information comprises, for each event of the sequence of events, a plurality of affinities of the each event to each cluster of the pre-specified number of clusters, wherein the plurality of affinities includes a respective affinity of the each event to each respective cluster of the pre-specified number of clusters.

14. The system of claim 13, wherein generating the predictive information comprises using the optimized plurality of loss functions to determine:
via the first loss function, the predicted event type for the next event to occur after the sequence of events;
via the second loss function, the predicted time for the next event to occur after the sequence of events; and
via the third loss function, the clustering information resulting from clustering the sequence of events.

15. The system of claim 13, wherein the time information for each event of the sequence of events comprises a time stamp indicative of a time of occurrence of the event.

16. The system of claim 13, the non-transitory computer-readable medium further storing program code executable by the one or more processors, the program code comprising instructions that when executed by the one or more processors cause the one or more processors to perform operations comprising converting, for at least one event of the sequence of events, the time information for the at least one event to a time gap information indicating a length of time between occurrence of the at least one event and occurrence of an additional event adjacent to the at least one event of the sequence of events and occurring before the at least one event.

17. The system of claim 13, wherein, for at least one event of the sequence of events, the time information for the at least one event specifies a time gap information indicating a length of time between occurrence of the at least one event and occurrence of an additional event adjacent to the at least one event of the sequence of events and occurring before the at least one event.

18. The system of claim 13, wherein generating the predictive information comprises using, by the trained model, a hidden state of the neural network.

19. A non-transitory computer-readable medium having program code that is stored thereon, the program code executable by one or more processing devices for performing operations comprising:
training a neural network implemented using instructions executed by one or more computer systems to generate a trained model, wherein the neural network is trained to determine a training prediction, from a particular hidden state determined via the neural network for an input sequence of training events,
wherein training the neural network includes optimizing a plurality of loss functions comprising:
(1) a first loss function for determining a next training event to occur after the input sequence of training events, the next training event included in the training prediction,
(2) a second loss function for determining a predicted training time of the next training event, the predicted training time included in the training prediction, and
(3) a third loss function for determining a plurality of clusters including a respective cluster affinity distribution for each training event in the input sequence of training events, respective cluster affinity distribution included in the training prediction;
providing sequence information for a sequence of events as input to the trained model, the sequence information comprising, for each event of the sequence of events, information identifying an event type for the event and time information for the event indicative of when the event occurred, wherein the event type is selected from a set of event types;
generating, by the trained model, for each event of the sequence of events, a vector representation for the event, the vector representation for the event including a representation of the event type for the event and a representation of the time information for the event, wherein the vector representation represents a point in a joint event-time space; and
generating, by the trained model and based upon the vector representations for the sequence of events, predictive information comprising (1) a prediction of a next event to occur after the sequence of events, the prediction of the next event comprising (i) a predicted event type for the next event selected from the set of event types and (ii) a predicted time indicative of when the next event will occur and (2) clustering information resulting from clustering the sequence of events into a pre-specified number of clusters, wherein the clustering information comprises, for each event of the sequence of events, a plurality of affinities of the each event to each cluster of the pre-specified number of clusters, wherein the plurality of affinities includes a respective affinity of the each event to each respective cluster in the pre-specified number of clusters.

20. The non-transitory computer-readable medium of claim 19, wherein generating the predictive information comprises using the optimized plurality of loss functions to determine:
via the first loss function, the predicted event type for the next event to occur after the sequence of events;
via the second loss function, the predicted a time for the next event to occur after the sequence of events; and
via the third loss function, the clustering information resulting from clustering the sequence of events.

* * * * *